United States Patent
Kato et al.

(10) Patent No.: US 9,346,001 B2
(45) Date of Patent: May 24, 2016

(54) AIR FILTER CARTRIDGES, COMPONENTS THEREOF; AND, AIR CLEANER ASSEMBLIES

(75) Inventors: Shigeo Kato, Tokyo (JP); Hajime Yao, Tokyo (JP); Yota Kawabe, Tokyo (JP); Yutaka Kuwabara, Isesaki (JP); Junich Teshigawara, Maebashi (JP); Shugo Yanada, Isesaki (JP)

(73) Assignee: Donaldson Company, Inc., Minneapolis, MN (US)

( * ) Notice: Subject to any disclaimer, the term of this patent is extended or adjusted under 35 U.S.C. 154(b) by 111 days.

(21) Appl. No.: 14/000,516

(22) PCT Filed: Feb. 24, 2012

(86) PCT No.: PCT/US2012/026596
§ 371 (c)(1),
(2), (4) Date: Dec. 27, 2013

(87) PCT Pub. No.: WO2012/116314
PCT Pub. Date: Aug. 30, 2012

(65) Prior Publication Data
US 2014/0102060 A1    Apr. 17, 2014

Related U.S. Application Data

(60) Provisional application No. 61/446,653, filed on Feb. 25, 2011, provisional application No. 61/473,296, filed on Apr. 8, 2011.

(51) Int. Cl.
*B01D 46/24*    (2006.01)
*B01D 46/00*    (2006.01)
(Continued)

(52) U.S. Cl.
CPC ........ *B01D 46/2411* (2013.01); *B01D 46/0001* (2013.01); *B01D 46/0002* (2013.01); *B01D 46/0005* (2013.01); *B01D 46/2414* (2013.01); *B01D 46/521* (2013.01); *F01N 3/0211* (2013.01); *B01D 2265/026* (2013.01); *B01D 2265/028* (2013.01); *B01D 2271/027* (2013.01); *B01D 2275/201* (2013.01)

(58) Field of Classification Search
CPC ........... B01D 46/0002; B01D 46/0005; B01D 46/2411; B01D 46/2414; B01D 2271/027
See application file for complete search history.

(56) References Cited

U.S. PATENT DOCUMENTS

| | | | |
|---|---|---|---|
| 2,771,156 A | 11/1956 | Kasten et al. | |
| 3,002,870 A | 10/1961 | Belgarde et al. | |
| 3,048,959 A | 8/1962 | Lowther | |

(Continued)

FOREIGN PATENT DOCUMENTS

| | | |
|---|---|---|
| BE | 1011567 A3 | 11/1989 |
| EP | 0 480 991 B1 | 4/1992 |

(Continued)

OTHER PUBLICATIONS

International Search Report for International Application No. PCT/US2012/026596 mailed Jul. 5, 2012.

(Continued)

*Primary Examiner* — Robert Clemente
(74) *Attorney, Agent, or Firm* — Merchant & Gould, P.C.

(57) ABSTRACT

Air cleaner assemblies, features thereof and components thereof are described. Among the components described are a main filter cartridge and a safety cartridge.

20 Claims, 29 Drawing Sheets

(51) Int. Cl.
*B01D 46/52* (2006.01)
*F01N 3/021* (2006.01)

(56) References Cited

U.S. PATENT DOCUMENTS

| | | |
|---|---|---|
| 3,078,650 A | 2/1963 | Anderson et al. |
| 3,160,488 A | 12/1964 | Wilber |
| 3,169,844 A | 2/1965 | Young |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |
| 3,423,909 A | 1/1969 | Bennett et al. |
| 3,452,519 A | 7/1969 | Bianchetta |
| 3,488,928 A | 1/1970 | Tarala |
| 3,584,439 A | 6/1971 | Gronholz |
| 3,672,130 A | 6/1972 | Sullivan et al. |
| 3,710,560 A | 1/1973 | Maddocks |
| 3,716,436 A | 2/1973 | Pall et al. |
| 4,006,000 A | 2/1977 | Tortorici et al. |
| 4,062,781 A | 12/1977 | Strauss et al. |
| 4,128,251 A | 12/1978 | Gaither et al. |
| 4,135,899 A | 1/1979 | Gauer |
| 4,159,197 A | 6/1979 | Schuler et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,303,426 A | 12/1981 | Battis |
| 4,349,363 A | 9/1982 | Patel et al. |
| 4,350,509 A | 9/1982 | Alseth et al. |
| 4,402,830 A | 9/1983 | Pall |
| 4,452,619 A | 6/1984 | Wright et al. |
| 4,488,889 A | 12/1984 | McCarroll |
| 4,491,460 A | 1/1985 | Tokar |
| 4,495,072 A | 1/1985 | Fields |
| 4,498,915 A | 2/1985 | Witchell |
| 4,588,426 A | 5/1986 | Virgille et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,950,317 A | 8/1990 | Dottermans |
| 4,955,996 A | 9/1990 | Edwards et al. |
| 5,045,192 A | 9/1991 | Terhune |
| 5,064,458 A | 11/1991 | Machado |
| 5,071,456 A | 12/1991 | Binder et al. |
| 5,082,476 A | 1/1992 | Kahlbaugh et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,431,168 A | 7/1995 | Webster, Jr. |
| 5,442,721 A | 8/1995 | Ames |
| 5,445,241 A | 8/1995 | Nakamura et al. |
| 5,484,466 A | 1/1996 | Brown et al. |
| 5,545,241 A | 8/1996 | Vanderauwera et al. |
| 5,547,480 A | 8/1996 | Coulonvaux |
| 5,556,440 A | 9/1996 | Mullins et al. |
| 5,601,717 A | 2/1997 | Villette et al. |
| 5,605,555 A | 2/1997 | Patel et al. |
| 5,605,625 A | 2/1997 | Mills |
| 5,613,992 A | 3/1997 | Engel |
| 5,632,791 A | 5/1997 | Oussoren et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |
| 5,720,790 A | 2/1998 | Kometani et al. |
| 5,730,769 A | 3/1998 | Dungs et al. |
| 5,736,040 A | 4/1998 | Duerrstein et al. |
| 5,741,421 A | 4/1998 | Erdmannsdoerfer et al. |
| 5,753,117 A | 5/1998 | Jiang |
| 5,755,842 A | 5/1998 | Patel et al. |
| 5,755,844 A | 5/1998 | Arai et al. |
| 5,800,581 A | 9/1998 | Gielink et al. |
| D401,306 S | 11/1998 | Ward |
| 5,865,863 A | 2/1999 | DeSousa et al. |
| 5,882,367 A | 3/1999 | Morgan et al. |
| 5,893,937 A | 4/1999 | Moessinger-Europiclon |
| 5,897,676 A | 4/1999 | Engel et al. |
| 5,916,435 A | 6/1999 | Spearman et al. |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| 5,984,109 A | 11/1999 | Kanwar et al. |
| 6,004,366 A | 12/1999 | Engel et al. |
| 6,039,778 A | 3/2000 | Coulonvaux |
| 6,051,042 A | 4/2000 | Coulonvaux |
| 6,090,177 A | 7/2000 | Moessinger et al. |
| 6,099,606 A | 8/2000 | Miller et al. |
| 6,149,700 A | 11/2000 | Morgan et al. |
| 6,152,979 A | 11/2000 | Cappuyns |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,322,602 B2 | 11/2001 | Engel et al. |
| 6,383,244 B1 | 5/2002 | Wake et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,413,289 B2 | 7/2002 | Engel et al. |
| 6,416,561 B1 | 7/2002 | Kallsen et al. |
| 6,419,718 B1 | 7/2002 | Klug et al. |
| 6,436,162 B1 | 8/2002 | Wake et al. |
| 6,440,188 B1 | 8/2002 | Clements et al. |
| 6,447,567 B1 | 9/2002 | Ehrenberg |
| 6,485,535 B1 | 11/2002 | Linnersten et al. |
| D467,654 S | 12/2002 | Klug et al. |
| 6,521,009 B2 | 2/2003 | Engel et al. |
| D471,623 S | 3/2003 | Gieseke et al. |
| 6,540,806 B2 | 4/2003 | Reinhold |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,838 B1 | 7/2003 | Mullins et al. |
| 6,599,342 B2 | 7/2003 | Andress et al. |
| 6,602,308 B1 | 8/2003 | Carle et al. |
| D481,101 S | 10/2003 | Boehrs et al. |
| 6,652,614 B2 | 11/2003 | Gieseke et al. |
| D485,339 S | 1/2004 | Klug et al. |
| 6,736,874 B2 | 5/2004 | Rieger et al. |
| 6,752,924 B2 | 6/2004 | Gustafson et al. |
| 6,837,920 B2 | 1/2005 | Gieseke et al. |
| D513,314 S | 12/2005 | Iddings et al. |
| 6,986,805 B2 | 1/2006 | Gieseke et al. |
| 7,070,642 B2 | 7/2006 | Scott et al. |
| 7,086,777 B2 | 8/2006 | Kozyuk |
| 7,094,343 B2 | 8/2006 | Moessinger et al. |
| 7,115,156 B2 | 10/2006 | Schaerlund et al. |
| 7,291,198 B2 | 11/2007 | Gieseke et al. |
| 7,311,748 B2 | 12/2007 | Holmes et al. |
| 7,413,588 B2 | 8/2008 | Holzmann et al. |
| 7,524,349 B2 | 4/2009 | Schrage et al. |
| 7,537,631 B2 | 5/2009 | Scott et al. |
| 7,572,310 B2 | 8/2009 | Gieseke et al. |

(56) References Cited

U.S. PATENT DOCUMENTS

| | | |
|---|---|---|
| 7,625,419 B2 | 12/2009 | Nelson et al. |
| 7,662,203 B2 | 2/2010 | Scott et al. |
| 7,981,186 B2 | 7/2011 | Schrage et al. |
| 7,988,757 B2 | 8/2011 | Scott et al. |
| 8,038,756 B2 | 10/2011 | Iddings et al. |
| 8,062,399 B2 | 11/2011 | Nelson et al. |
| 8,066,791 B2 | 11/2011 | Baseotto et al. |
| 8,142,533 B2 | 3/2012 | Gillenberg et al. |
| 8,147,576 B2 | 4/2012 | Gillenberg et al. |
| 8,152,876 B2 | 4/2012 | Gillenberg et al. |
| 8,216,335 B2 | 7/2012 | Scott et al. |
| 8,273,143 B2 | 9/2012 | Coulonvaux et al. |
| 8,287,612 B2 | 10/2012 | Gillenberg et al. |
| 8,292,984 B2 | 10/2012 | Baseotto et al. |
| 8,328,897 B2 | 12/2012 | Nelson et al. |
| 8,328,987 B2 | 12/2012 | Beaupre et al. |
| 8,394,166 B2 | 3/2013 | Scott et al. |
| 8,414,675 B2 | 4/2013 | Iddings et al. |
| 8,460,425 B2 | 6/2013 | Scott et al. |
| 8,480,778 B2 | 7/2013 | Baseotto et al. |
| 8,545,588 B2 | 10/2013 | Iddings et al. |
| 8,591,621 B2 | 11/2013 | Ruhland et al. |
| 8,702,831 B2 | 4/2014 | Scott et al. |
| 8,753,415 B2 | 6/2014 | Coulonvaux et al. |
| 8,852,309 B2 | 10/2014 | Scott et al. |
| 8,864,866 B2 | 10/2014 | Osendorf et al. |
| 8,920,530 B2 | 12/2014 | Ruhland et al. |
| 9,039,802 B2 | 5/2015 | Scott et al. |
| 2002/0014058 A1 | 2/2002 | Engel et al. |
| 2003/0051455 A1 | 3/2003 | Gieseke et al. |
| 2004/0134171 A1 | 7/2004 | Scott et al. |
| 2004/0261383 A1 | 12/2004 | Schaerlund et al. |
| 2006/0086075 A1 | 4/2006 | Scott et al. |
| 2008/0190082 A1 | 8/2008 | Scott et al. |
| 2009/0049814 A1 | 2/2009 | Baseotto et al. |
| 2009/0094951 A1 | 4/2009 | Baseotto et al. |
| 2009/0100813 A1 | 4/2009 | Iddings et al. |
| 2009/0145095 A1 | 6/2009 | Juliar et al. |
| 2009/0217632 A1 | 9/2009 | Coulonvaux et al. |
| 2010/0146920 A1 | 6/2010 | Iddings et al. |
| 2010/0147381 A1 | 6/2010 | Haney et al. |
| 2011/0308212 A1 | 12/2011 | Ruhland et al. |
| 2014/0223868 A1 | 8/2014 | Kaufmann et al. |
| 2014/0223869 A1 | 8/2014 | Kaufmann et al. |
| 2014/0223870 A1 | 8/2014 | Kaufmann et al. |
| 2014/0224129 A1 | 8/2014 | Kaufmann et al. |

FOREIGN PATENT DOCUMENTS

| | | |
|---|---|---|
| EP | 0 562 502 A | 9/1993 |
| EP | 1 354 617 | 10/2003 |
| FR | 2 214 505 | 8/1984 |
| GB | 1 124 735 | 8/1968 |
| GB | 1 499 922 | 2/1978 |
| GB | 1 511 904 | 5/1978 |
| GB | 2 110 110 | 6/1983 |
| GB | 2 119 674 | 11/1983 |
| GB | 2 163 368 | 2/1986 |
| WO | 99/42719 | 8/1999 |
| WO | WO 2006/119414 | 11/2006 |
| WO | WO 2009/014982 | 1/2009 |
| WO | WO 2009/014986 | 1/2009 |

OTHER PUBLICATIONS

Pending claims of U.S. Appl. No. 14/717,251 dated Jun. 26, 2015.
Pending claims of U.S. Appl. No. 14/040,966 dated Jun. 26, 2015.
Pending claims of U.S. Appl. No. 14/506,864 dated Jun. 26, 2015.
Pending claims of U.S. Appl. No. 14/336,268 dated Jun. 26, 2015.
Pending claims of U.S. Appl. No. 13/841,440 dated Jun. 26, 2015.
Pending claims of U.S. Appl. No. 14/718,249 dated Jun. 26, 2015.
Pending claims of U.S. Appl. No. 14/646,532 dated Jun. 26, 2015.
Pending claims of U.S. Appl. No. 14/518,102 dated Jun. 26, 2015.
Pending claims of U.S. Appl. No. 13/936,525 dated Jun. 26, 2015.
Pending claims of U.S. Appl. No. 14/717,251 dated Dec. 15, 2015.
Pending claims of U.S. Appl. No. 14/506,864 dated Dec. 15, 2015.
Pending claims of U.S. Appl. No. 14/336,268 dated Dec. 15, 2015.
Pending claims of U.S. Appl. No. 14/718,249 dated Dec. 15, 2015.
Pending claims of U.S. Appl. No. 14/646,532 dated Dec. 15, 2015.
Pending claims of U.S. Appl. No. 14/518,102 dated Dec. 15, 2015.
Pending claims of U.S. Appl. No. 14/040,966 dated Dec. 15, 2015.
Pending claims of U.S. Appl. No. 13/936,525 dated Dec. 15, 2015.

AIR FILTER CARTRIDGES, COMPONENTS THEREOF; AND, AIR CLEANER ASSEMBLIES

This application is being filed on 20 Aug. 2013, as a US National Stage of PCT International Patent application No. PCT/US2012/026596, filed 24 Feb. 2012 in the name of Donaldson Company, Inc., a U.S. national corporation, applicant for the designation of all countries except the US, and Shigeo Kato, Hajime Yao, Yota Kawabe, Yutaka Kuwabara, Junich Teshigawara, and Shugo Yanada, all citizens of Japan, applicants for the designation of the US only.

CROSS-REFERENCE TO RELATED APPLICATIONS

The present disclosure includes, with edits, the disclosure of PCT International Patent application No. PCT/US2012/026596, filed 24 Feb. 2012, U.S. provisional application 61/446,653, filed Feb. 25, 2011 and U.S. Ser. No. 61/473,296, filed Apr. 8, 2011. The complete disclosure of PCT/US2012/026596, U.S. 61/446,653 and 61/473,296 are incorporated herein by reference. To the extent appropriate, a claim of priority is made to each of PCT/US2012/026596, U.S. 61/446,653 and 61/473,296.

FIELD OF THE DISCLOSURE

The present disclosure relates to air cleaner assemblies and components therefor. The air cleaner assembly is configured for use to filter equipment intake air, for example combustion air for an internal combustion engine. Preferred features of serviceable filter cartridges for such an air cleaner assembly are described.

BACKGROUND

It is desirable to filter intake air to a variety of vehicles and other equipment. Typically, the intake air is combustion air for an internal combustion engine, often a diesel engine. The air cleaner assembly typically includes a housing and an internally positioned main filter cartridge. In some instances, a safety filter cartridge or secondary filter cartridge is included within the assembly.

Improvements in the features and components of air cleaner assemblies have been desired for one or more of: convenient manufacture; ease of serviceability; and, preferred performance. In the present disclosure, improved air cleaner assemblies and components therefor, including air filter cartridges, are described. These assemblies and components can provide for one or more of the desired improvements.

SUMMARY

According to the present disclosure, air filter cartridges, components thereof, features thereof, and air cleaner assemblies configured to use the air filter cartridges are described. Main filter cartridges and safety cartridges (or towers) are characterized. In typical use, a main air filter cartridge is generally removably positioned within the air cleaner housing, preferably in a position over an optional safety filter cartridge, or tower.

Components for filter cartridges are also characterized. Components characterized include a preform usable within, and to facilitate formation of, a main air filter cartridge. Example preforms depicted comprise an inner liner section and an end section typically non-separable from one another, for example snap fit together or molded together and integral, although alternatives are possible.

There is no specific requirement that a filter cartridge (main or safety), air cleaner assembly, feature of component thereof, include all of the characterized features described or depicted herein, in order to obtain some benefit according to the present disclosure. Also some example dimensions and shapes are provided to facilitate understanding. There is no requirement that the techniques disclosed be practiced with the particular dimensions, relative dimensions or shapes described, unless otherwise required.

BRIEF DESCRIPTION OF THE DRAWINGS

in FIG. 16 selected portions being depicted in cross-section for clarity.

DETAILED DESCRIPTION

I. A First Embodiment

FIGS. 1-13

Figure 1:
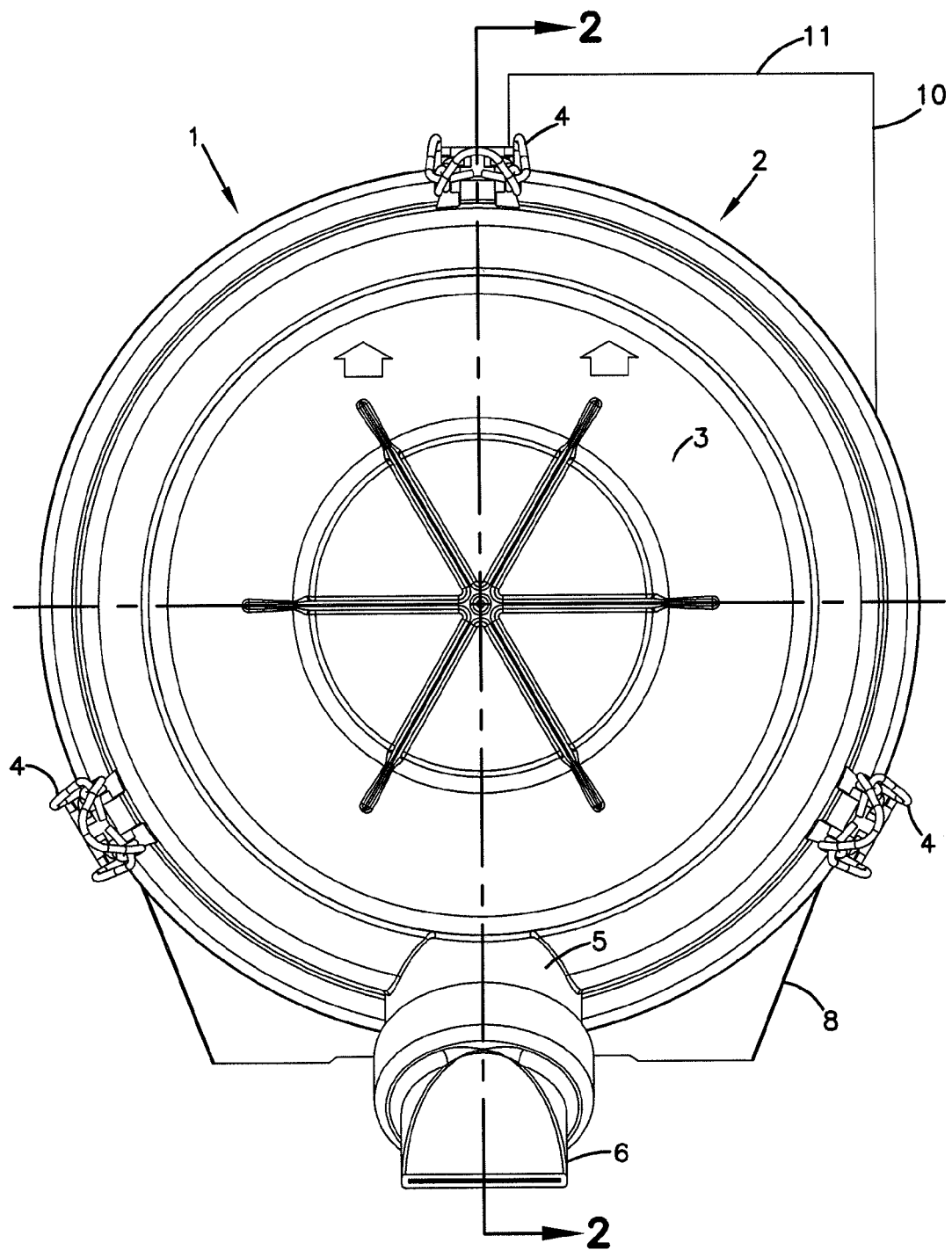
FIG. 1 is a schematic access cover end view of an air cleaner assembly according to a certain aspects of the present disclosure.

Reference numeral 1, FIG. 1, generally designates an air cleaner assembly according to the present disclosure. The assembly 1 generally comprises a housing 2. An end of the housing 2 comprises an access cover 3, removable from a remainder of the housing 2, for service access to an interior thereof. The depicted access cover 3 is removeably secured to a remainder of the housing 2 by over center latches 4, although alternatives are possible.

Still referring to FIG. 1, the housing 2 includes a downwardly directed ejector tube 5 closed by an evacuator valve 6.

The particular housing 2 depicted, includes a base or mounting pad arrangement 8 to facilitate securing to equipment for use.

At 10 is a depicted an air inlet to the air cleaner assembly 1. Air to be filtered passes into open end 11 of inlet 10. The inlet 10 depicted is a side inlet, although alternatives are possible. By this it is meant that air to be filtered process through a side of housing 2, as opposed to an end.

It is noted that for the particular air cleaner assembly 1 depicted, the inlet 10 is a "tangential inlet." By this it is meant that the inlet 10 defines a center line that is not directed radially toward a center of the housing 2, but rather is directed generally tangentially. This helps air flow entering the housing 2 to be directed into a circular or cyclonic pattern around a center of the housing, to facilitate dust separation. It is noted that alternate types of inlets can be used with some of the features according to the present disclosure. However, tangentially directed inlets are typical and preferred.

Figure 2:
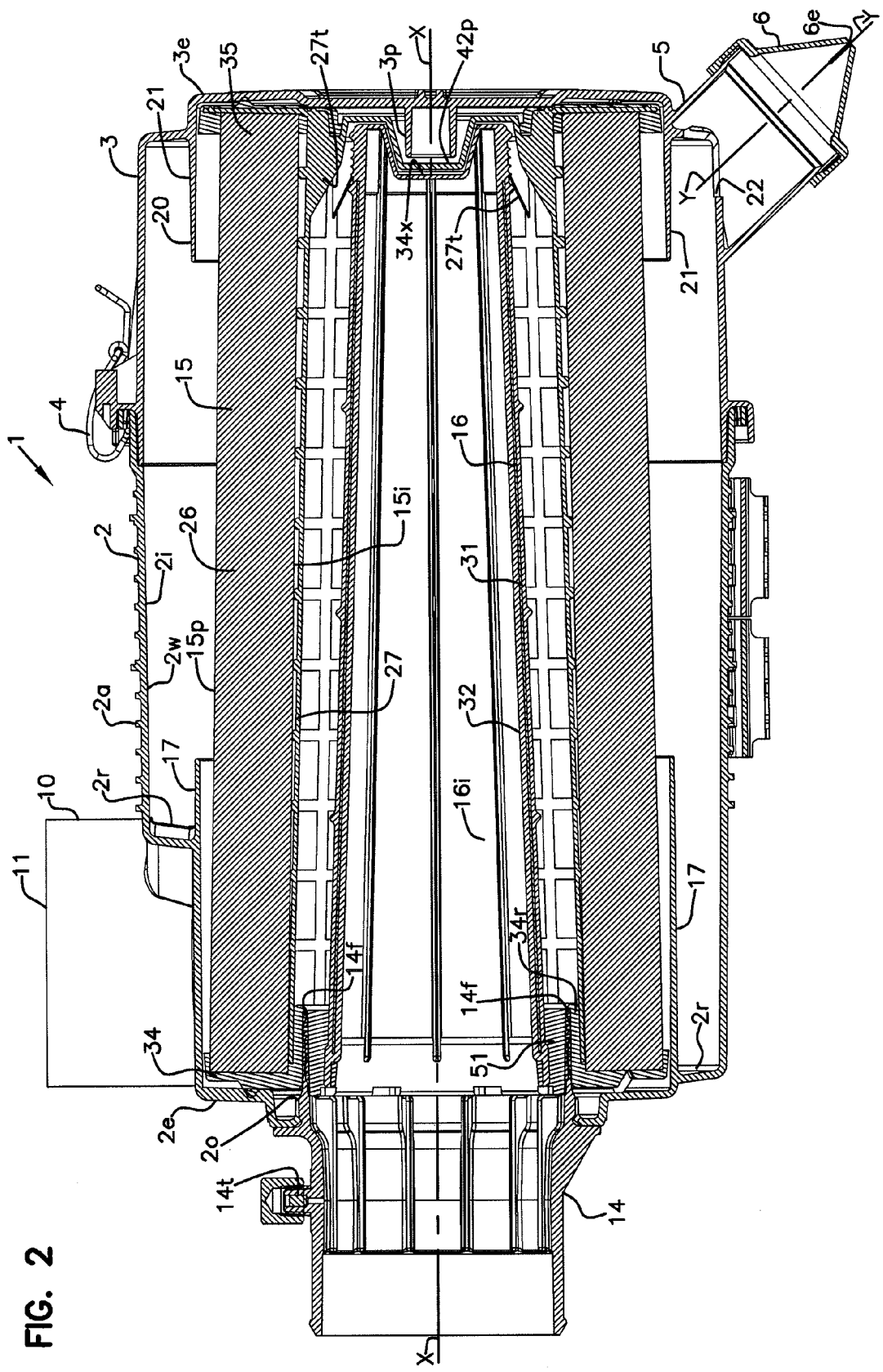
FIG. 2 is a schematic side cross-sectional view of the air cleaner assembly of FIG. 1, taken along line 2-2, thereof.

Attention is now directed to FIG. 2, a side cross-sectional of the air cleaner assembly 1 taken generally along line 2-2, FIG. 1. Referring to FIG. 2, the housing 2 can be seen as comprising, removeably secured together, access cover 3 and remainder housing section 2a; in the example depicted, the two being secured together by latches 4. The housing 2 generally defines an interior 2i having a sidewall 2w defining a generally circular cross-section and through which inlet 10 extends. The housing 2 extends between: a closed end 3e defined by the access cover 3; and, an opposite open end 2e defined by housing section 2a. In the example assembly 1 depicted, the inlet 10 is positioned adjacent to, or closer to, end 2e, than end 3e. End 2e has a central, in the example depicted axial, air flow outlet 2o therein, by which filtered air leaves the housing 2, to be directed to downstream equipment. In the context of this characterization of outlet 2o, the term "axial" is meant to refer to an outlet generally aligned with, and intersected by, a central longitudinal axis X of the housing 2, as shown. Alternative outlets are possible.

For the particular air cleaner assembly 1 depicted, at outlet 2o is positioned outlet tube 14. The outlet tube 14 can be secured in place an housing 2 by a snap-fit as depicted, or by alternate means. The particular outlet tube 14 depicted, includes a tap 14t, to which a restriction indicator or other equipment can be secured. Also the tube 14 includes an inwardly directed, tubular, circular flange 14f that extends inwardly of housing 2, i.e. into the interior 2i, generally axially, toward end 3e. The flange 14f, as will be understood from further descriptions below, comprises a seal flange surrounding axis X that provides: a radially (in this example outwardly) directed seal surface for engagement by a main cartridge 15; and, a radially (in this example inwardly) directed seal surface for engagement by a safety cartridge 16. These cartridges 15, 16 and features relating to sealing will be discussed further below. By "radially inwardly" reference is meant to a direction toward central axis X; and, by "radially outwardly" reference is meant to a direction generally away from central (longitudinal) housing and/or cartridge axis X.

Still referring to FIG. 2, at 17 an optional inlet shield is depicted extending axially from end 2e towards end 3e and surrounding the internally positioned cartridges 15, 16. The flange 17 will generally define an air flow annulus between the flange 17 and outer wall 2w of housing section 2a, at least in a portion of the housing 2. Further, the housing section 2a will generally be configured to define a cyclonic internal end ramp 2r around flange 17. As air enters inlet 10 through opening 11 it is directed into the annulus between wall 2w and flange 17. The ramp 2r will generally direct the air in a cyclonic flow around axis X and toward end 3e, as it passes through in annulus 17. This will create a cyclonic (or spiral) precleaner effect in which a portion of the material contained within the inlet air is directed against outer wall 2w and eventually into ejection tube 5. This material can be solid particulate material and/or water. As the volume from the material within tube 5 increases, eventually valve 6 will open sufficiently at end 6e, to allow the material to be evacuated from interior 2i.

In general terms, the combination of: the tangential air flow; the shield 17; the cyclonic end ramp 2r; the ejector 5 and the valve 6, will sometimes be referred to as a first stage precleaner. By the term "first stage precleaner" it is meant that the assembly 1 includes features providing that a reclining of the air will occur, before the air enters, and is filtered by, the main cartridge 15. An air cleaner assembly such as assembly 1, including a precleaner arrangement, as described, and a filter cartridge arrangement, as described, will sometimes be referred to as a "two-stage" air cleaner; the first stage being the precleaner stage; and, the second stage being the filter cartridge stage.

Still referring to FIG. 2, the housing 2 includes, in access cover 3, a second (optional) internal flange 20 surrounding an end of internally positioned cartridges 15, 16, and extending from end 3e axially toward end 2e. Flange 20 defines, extending completely therearound, annulus 21. In communication with annulus 21 is provided ejector port 22, providing communication between interior 2i and ejector tube 5. In general, the flange 20 provides that material within interior 2i, to be separated by the precleaner operation resulting from the cyclonic effect, tends to be directed to annulus 21 and into ejector port 22, rather than into the cartridge 15. Also, as will be understood from further description below, adjacent end 3e, the depicted flange 20 surrounds and supports an end of internally positioned cartridge 15.

Still referring to FIG. 2, it is noted that a central axis Y of ejector tube 5 and valve 6 is generally directed at an angle relative to central axis X, of about 45° (typically 30°-60°, inclusive). This provides that whether the assembly 2 is mounted with axis X directed horizontally or vertically, axis Y can still be directed generally downwardly. Alternate orientations of axis Y are possible, but the one depicted is advantageous at least for this reason.

Referring still to FIG. 2, positioned within housing interior 2i is main filter cartridge 15. The main filter cartridge 15 comprises media 26 positioned surrounding an enclosed cartridge interior 15i. For the particular cartridge 15 depicted, the media 26 is positioned on, and surrounding, an optional inner liner 27 (or liner section 27s) which provides downstream support for the media 26 along interior 15i. The optional inner liner 27 (or liner section 27a) typically extends completely between end pieces 34, 35, but alternatives are possible. As air passes through the media 26 from outer perimeter 15p, to interior 15i, it is filtered by passage through media 26. The media 26 can be pleated media having inner and outer pleat tips, or can be depth media, (or both) as selected for a given application. Typically, the media 26 will be pleated and configured with a pleat depth of at least 15 mm, typically at least 25 mm, and often within the range of 25 mm to 50 mm, inclusive, although alternatives are possible. The pleat tips can be configured, for example, with pleat spacing provided by folded and/or scored portions thereof, such as available from the Assignee of the present disclosure, Donaldson Company, Inc. of Bloomington, Minn. 55402, under the trade designation "PLEATLOC." Example such arrangements are described, for example, in U.S. Pat. No. 4,452,619, incorporated herein by reference.

After the air passes into interior 15i, it is then directed through optional secondary or safety filter cartridge 16 comprising media 31 supported by framework 32. After the air reaches interior 16i of optional safety cartridge 16 it is directed in the general direction of axis X toward end 2e and outwardly from housing 2 through outlet 2o (by flow into outlet tube 14) and therefrom through downstream duct work or other arrangements to the equipment of concern, typically the engine air intake for a combustion engine.

The main filter cartridge 15 is generally a serviceable component, i.e. it can be removed from housing 2 and be refurbished or replaced as desired. Further, for the particular example assembly depicted, the optional safety cartridge 16 is also a service component, i.e. it can be removed from interior 2i of housing 2 and be refurbished or replaced.

Figure 3:
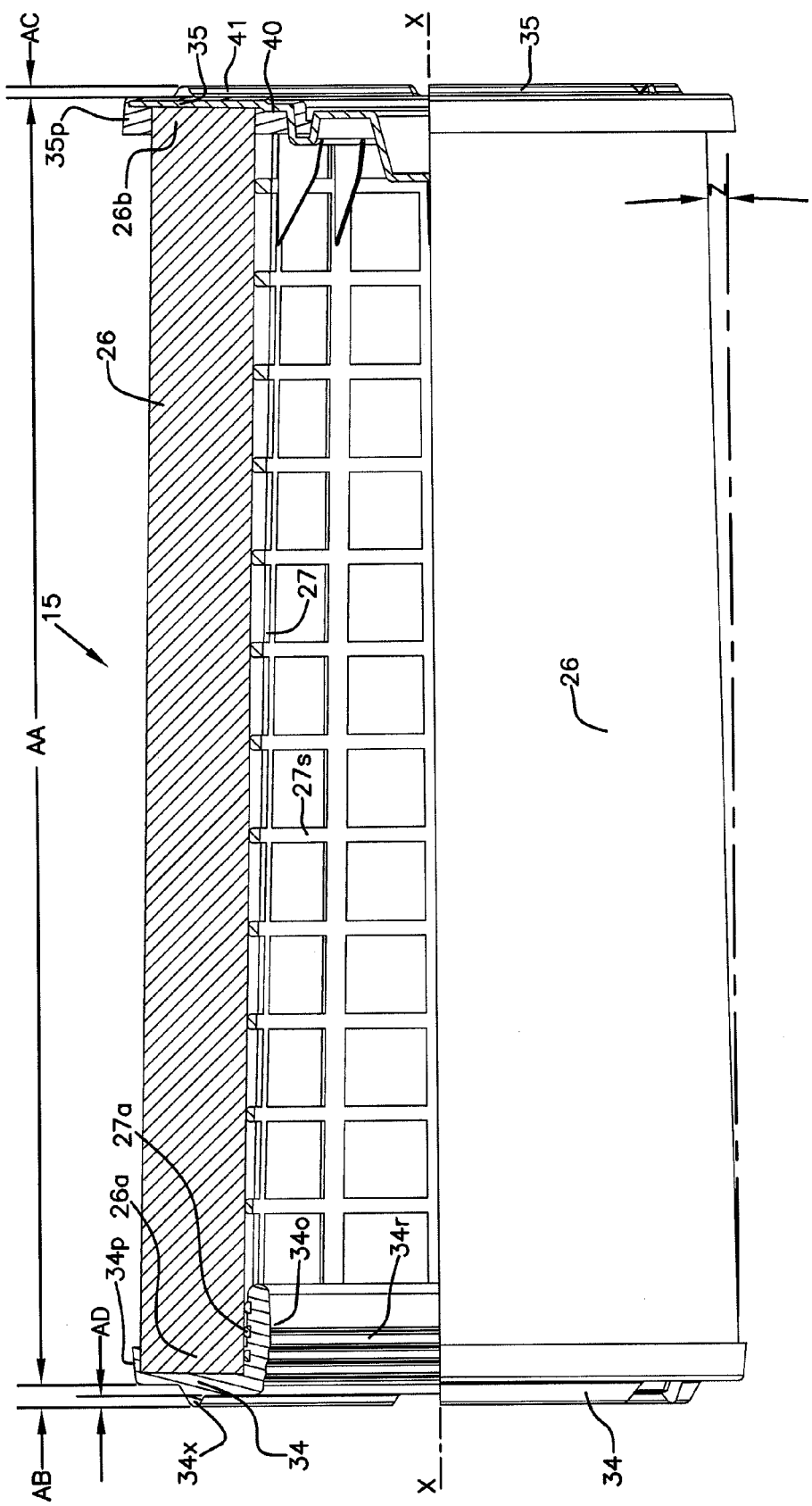
FIG. 3 is a schematic side, partially cross-sectional, view of a main air filter cartridge useable in the assembly of FIG. 2.
Figure 4:
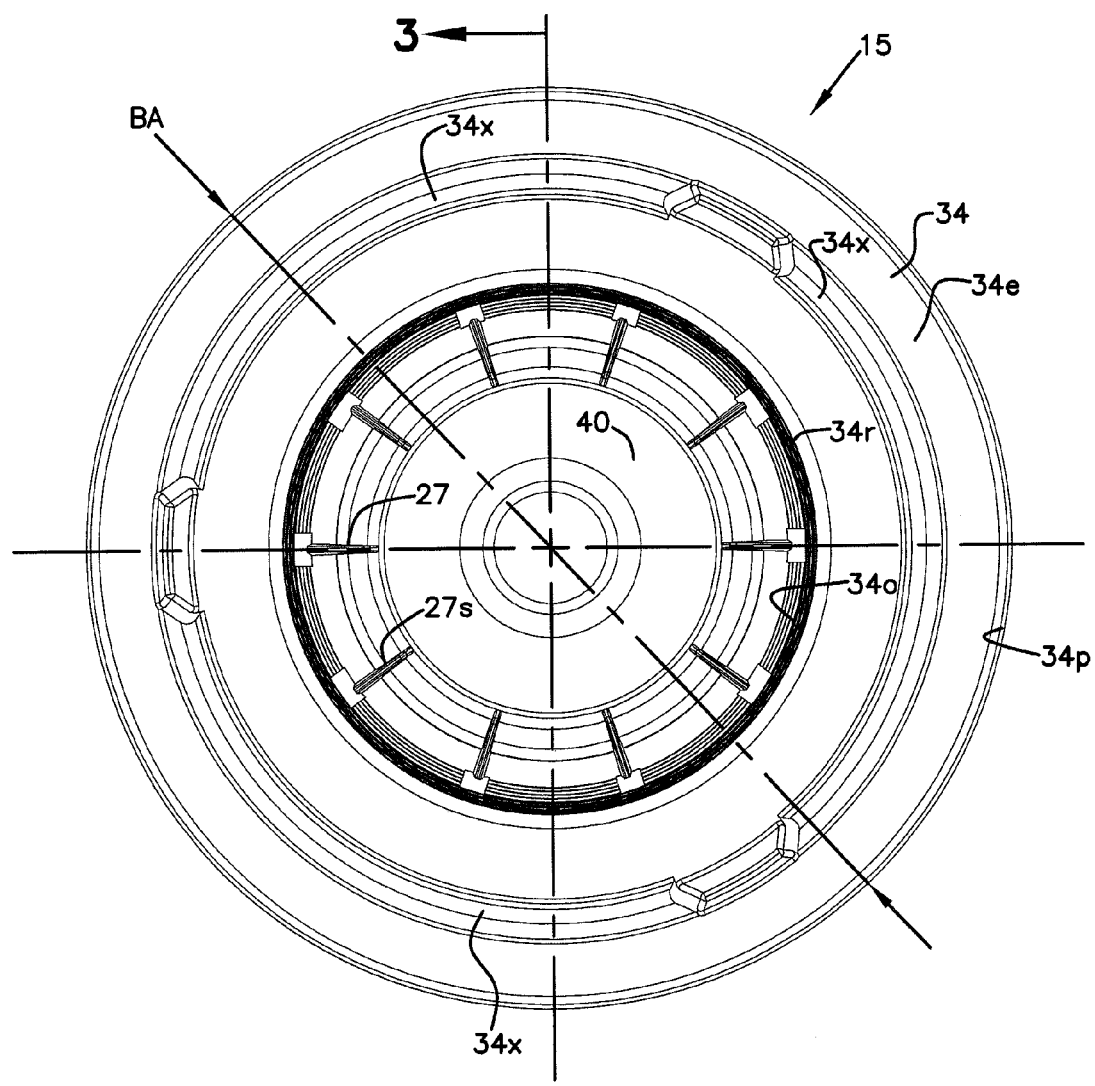
FIG. 4 is a schematic outlet end elevational view of the filter cartridge of FIG. 3.
Figure 5:
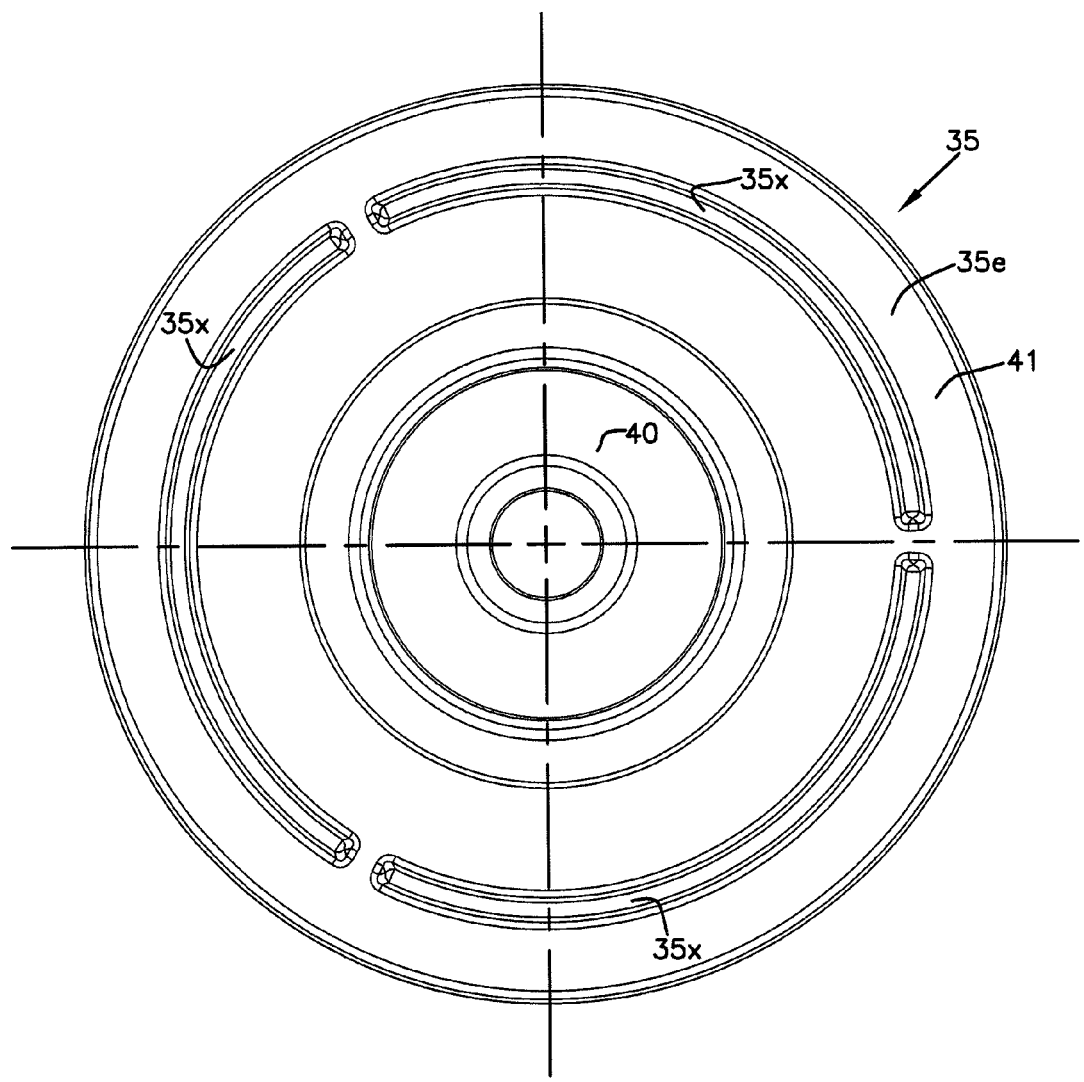
FIG. 5 is a schematic closed end elevational view of the filter cartridge of FIG. 3.

Attention is now directed to FIGS. 3-5, with respect to main cartridge 15. In FIG. 3, the main cartridge 15 is generally depicted in side elevational view, with a portion depicted in cross-section for viewing of internal detail. The main cartridge 15 comprises media 26 positioned in extension between opposite (first and second) end caps 34, 35, and around inner liner 27. End cap 34 is an open end cap defining outlet aperture 34o through which filtered air can leave cartridge 15 in a direction toward outlet 2o, FIG. 2.

The particular cartridge 15 depicted includes a portion of end cap 34 defining a radial (housing) seal 34r. Herein, the term "housing seal" and variants thereof is meant to refer to a seal on a cartridge that is positioned to form a releasable seal with a housing, when the cartridge is installed. Herein, the term "radial" when used in reference to a seal, is meant to refer to a seal that is generally directed (under sealing forces, when the cartridge is operably installed) toward or away from central axis X as opposed to in a direction of central axis X (referred to herein as axial). Herein, the term "operably installed" when used in reference to a cartridge, is meant to refer to a proper orientation of the referenced cartridge, within the housing 2, for air cleaner operation.

The particular housing seal 34r depicted, is positioned in radial overlap with a first end 26a of media 26. In the particular example, radial seal 34r is surrounded by the media 26 of the end 26a, and is a radially inwardly directed seal, i.e. the depicted seal 34r is radially inwardly directed or faces toward central axis X. In general terms, the depicted seal 34r is positioned such that a cross-section therethrough, in a direction perpendicular to central axis X, also passes through a portion of the media 26.

For the particular cartridge 15 depicted, typically and preferably end cap 34 is a molded-in-place end cap. That is, the end cap 34 is, preferably, molded onto a remainder of the cartridge 15, as opposed to being preformed and attached to the cartridge 15. The end cap 34 will typically comprise an adequately soft polymeric material capable of forming a good seal at end 26a of media 26, and also defining a strong robust seal region 34r. A usable material for this purpose is a polyurethane foam molded: to an as molded density typically no greater than 28 lbs/cu·ft (450 kg/cu·m) usually no greater than 22 lbs/cu·ft (385 kg/cu·m) and often within a range of 12-17 lbs/cult (192-235 kg/cu·m) inclusive; and, to a hardness Shore A of typically no greater than 25; usually no greater than 20; and, often within the range 10-20, inclusive.

For the particular cartridge 15 depicted, liner 27 has an end 27a which is overlapped by the material from which end cap 34 is molded. Thus, a portion (end) 27a of the liner 27 is positioned between seal 34r and media 26. This portion 27a of the liner 27 not only supports the media against bias toward axis X, it also provides a backup or support to region 34o of end cap 34 as it is compressed outwardly during sealing.

Opposite to end 26a, media 26 defines a second end 26b, adjacent end piece 35.

Although alternatives are possible (for example cylindrical), the particular media 26 depicted, is configured in a conical fashion, in extension between end piece 34 and end piece 35; i.e. in extension between first media end 26a and second, opposite, media end 26b, with the media 26 depending downwardly in outer perimeter size, in extension from first end 26a toward second end 26b. The liner 27 (or liner section 27s) also preferably defines a shape that tapers downwardly in size, from an end adjacent end cap 34 toward an end adjacent end cap 35, to accommodate a conical shape to the media pack 26, and, to facilitate forming the media 26 into a conical pattern, as shown, during cartridge assembly. A preferred definition for liner 27 to accomplish this is discussed further below in connection with FIGS. 6-10.

Referring still to FIG. 3, end piece 35 is a closed end piece, i.e. there is no aperture therethrough, in communication with interior 15i of cartridge 15. In general, the preferred end piece 35 depicted comprises two components: a frame portion 40; and, an overmold 41. The overmold 41 is generally molded-in-place and provides that the media 26 is sealed at end 26b while securing the liner 27 in position. The frame portion 40 is generally secured (typically non-removably) to, and in for example construction is integral with, liner 27. Features of the frame portion 40 will be understood from a discussion of FIGS. 6-11, below. Herein when it is said that the liner 27 or liner section 27s and the frame portion 40 are non-removably secured together in (or as) a preform it is meant that the when they are put together in the preform during prior to formation at the cartridge, they cannot be separated from one another or the preform without damage. When they are characterized as "integral" or "formed integrally" it is meant they are molded as a single piece preform, example from a plastic; a usable plastic for this purpose being a 20% glass-filled polypropylene, although alternatives are possible.

Still referring to FIG. 3, it is noted that the cartridge 15 does not include an outer liner surrounding the media 26 in extension between the end pieces 34, 35. This is a preferred configuration for main filter cartridges according to the present disclosure, although an outer inner can be used if desired. Further, the example cartridge 15 is devoid of any shield or preform material, i.e. material other than molded-in-place portions of end caps 34, 35, that extends around an outside of the media 26, whether in continuous extension between the end pieces 34, 35, or only partial extension therebetween. This too is preferred, although alternatives are possible.

Herein, when it is meant to be stated that there is no outer liner extending completely between the end pieces 34, 35 around the media 26, the cartridge 25 can be characterized as "axial outer liner free." When there is no shield or preform such as a plastic ring surrounding any portion of the media 26 that has a portion not embedded in the end pieces 34, 35, the cartridge 15 can be characterized as "outer shield free." The term "outer shield free" is not meant, however, to exclude the possibility that a portion of the overmold 41 of end cap 35, as shown at 35p, or portion of the molded-in-place end cap 34, as shown at 34p, cannot extend around an exterior of the media 26, adjacent the ends 26b, 26a respectively.

In the terms characterized in the previous several paragraphs, cartridge 15, FIG. 3 can be as both "outer liner free" and "outer shield free." This is preferred, although, again, alternatives.

It is noted that the cartridge 15 depicted is also free of any adhesive coil (for example for pleat spacing) extending around an outer perimeter of the 26. This too is preferred, although alternatives are possible. When the cartridge is as depicted in FIG. 3 and does not include an outer adhesive coil extending around a media 26, it will sometimes be referred to as "outer adhesive coil free."

The media 26 generally defines a "conical angle" i.e. an angle of declination from end 26a toward 26o, indicated generally at Z. The declination angle or conical angle, will typically be at least 0.2°, usually not more than 5°, and often within the range of 0.2°-4°, inclusive. (Alternate angles are possible, as reference below).

In FIG. 3, some example dimensions, for an example cartridge, are indicated as follows: AA=347 mm; AB=6 mm; AC=3 mm; AD=3 mm.

In FIG. 4, an end view of cartridge 15 is depicted, taken toward end piece 34. It is noted that on outer end surface 34e, end piece 34 includes, molded integrally therewith, optional spaced ribs 34x. These ribs form end (axial) bumpers, to engage end 2e of housing 2, see FIG. 2.

In FIG. 4, an example dimension is indicated a follows: BA=164.5 mm. In FIG. 5, an end view of end piece 35 is depicted. Outer end 35e of end piece 35 also is depicted as including optional spaced ribs 35x which serve as bumpers to engage end 3e of access cover 3, FIG. 2, during installation.

Figure 12:
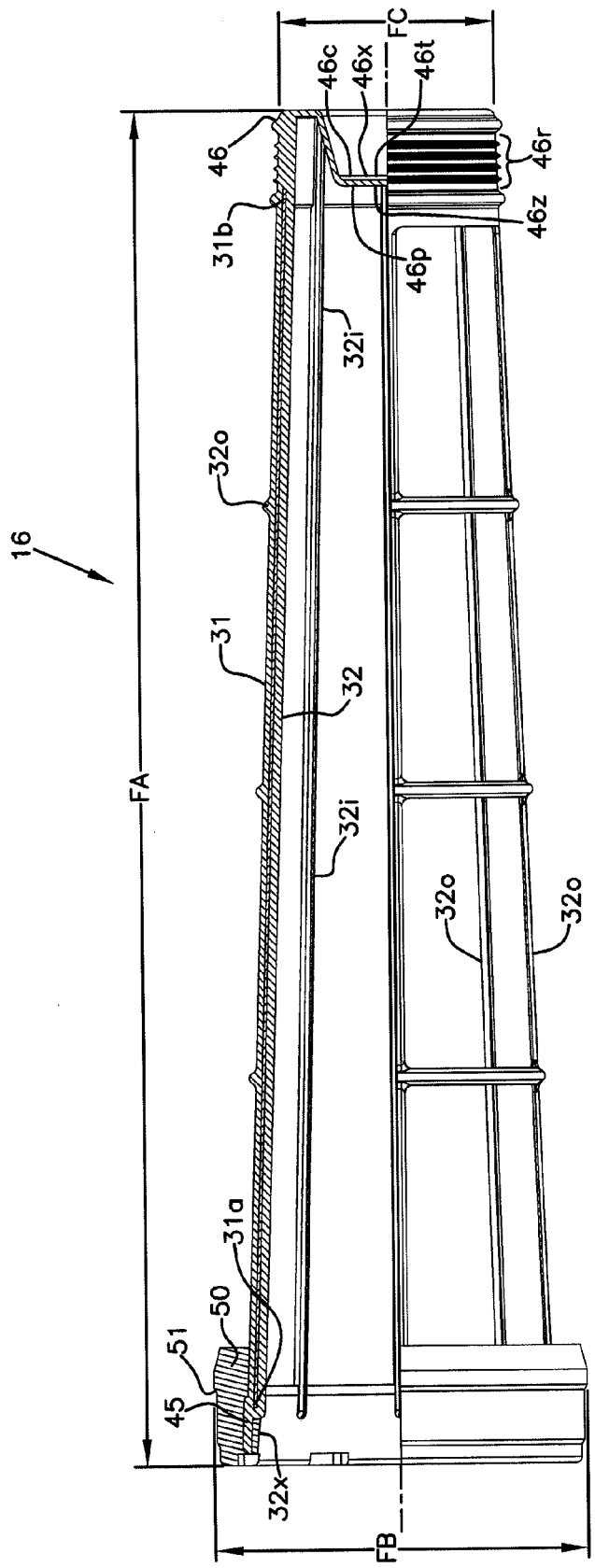
FIG. 12 is a schematic side, partially cross-sectional, view of a safety or secondary filter component of the assembly of FIG. 2.
Figure 13:
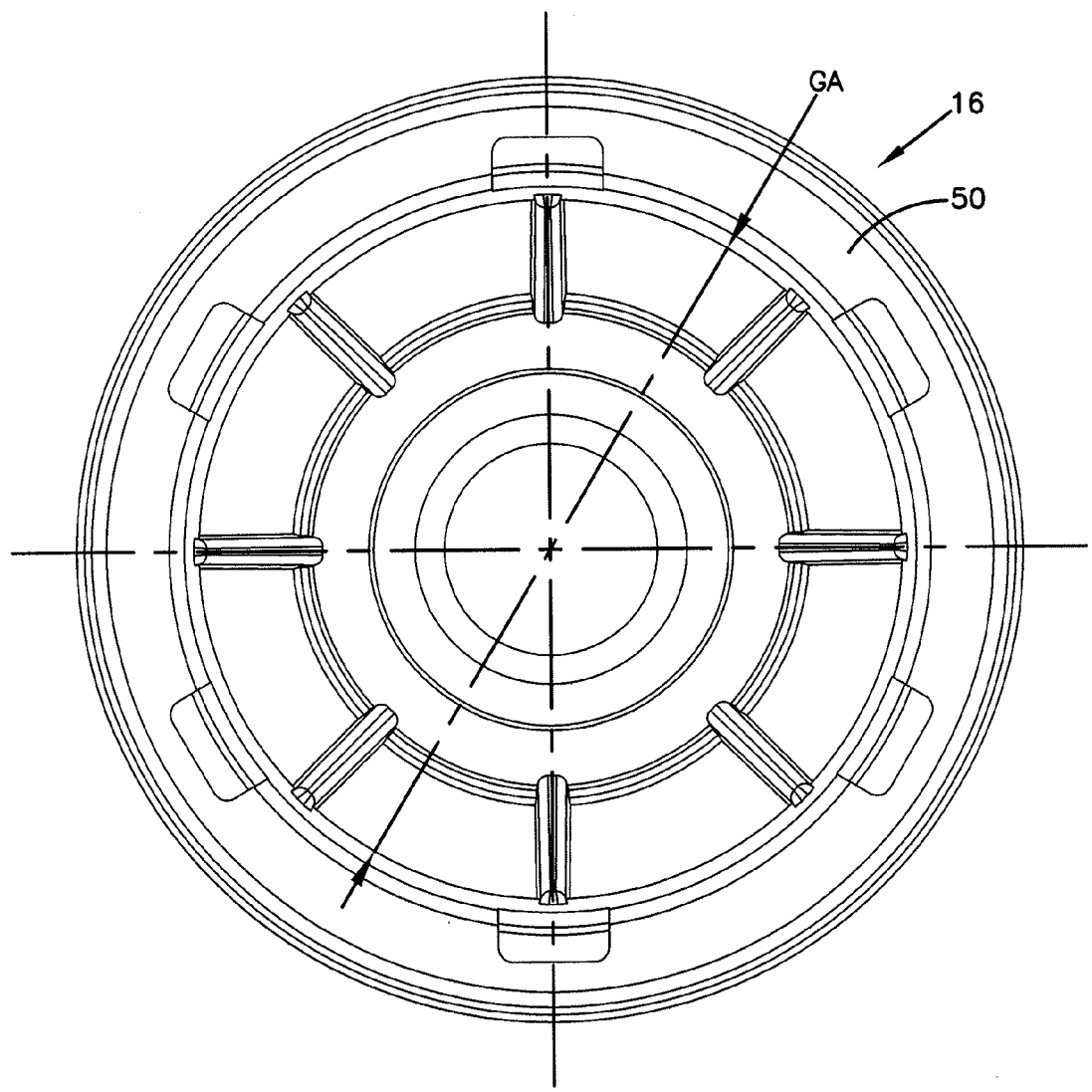
FIG. 13 is a schematic, outlet end, elevational view of the secondary filter cartridge of FIG. 12.

Attention is now directed to FIGS. 12 and 13, with respect to the optional secondary or safety cartridge 16. In FIG. 12, a side elevational view of the secondary cartridge 16 is depicted, with portions shown in cross-sectional view for understanding internal detail and construction.

Referring to FIG. 12, optional secondary cartridge 16 comprises media 31 (having opposite, first and second, ends 31a, 31b) supported by framepiece 32, in extension between opposite (first and second) framepiece ends 45, 46. The media 31 would typically be a conically shaped extension of thin, non-pleated, (usually non-woven) media, although alternatives are possible. For the example depicted, media 31 is secured within a framework 32 that (in the example) is molded-in-place, with the media 31 secured therein.

The framework 32 includes, extending between ends 45, 46, outer supports 32o and inner supports 32i. Each is configured to support the media 32, while providing an open, porous structure.

End 45 of framepiece 32 is an open end, with an outlet opening 32x therein. Molded-in-place on end 45 is positioned end piece 50. End piece 50 includes an outer annular surface 51 which defines an in the example (outwardly) radially directed radial (housing) seal, for sealing engagement with a radially in the example radially (inwardly) directed inner surface of flange 14f, FIG. 2. End piece 50 is typically molded-in-place, for example, from a polyurethane from. The polyurethane can, for example be analogous to the polyurethane foam described above for end cap 34, FIG. 3.

End 46 is a closed end and generally comprises a portion of the molded frame 32. The end 46 includes at least one, and typically a plurality, of radially outwardly directed ribs 46r thereon, surrounding end 46. The ribs 46r facilitate gripping, since cartridge 30 is typically installed or removed by gripping end 46.

The end 46 includes a central closed end section 46c that extends across and closes interior 32i adjacent end 46. The particular central section 46c depicted includes a projection 46p extending into interior 32i toward end 45. This projection 46p defines a most inward section 46z defining a recess in an outer surface 46x to define a receiver 46t to receive, projecting therein (in the example assembly 1 depicted, FIG. 2) a portion of the main filter cartridge 15 and a portion of the access cover 3 as discussed further below. The recess or receiver 46t is usually at least 5 mm, typically at least 10 mm in depth (often 15-35 mm, inclusive) from a tip of end 46 toward end 45.

In FIG. 13, an end elevational view taken toward end piece 50 is depicted. In FIGS. 12 and 13 some example dimensions are provided as follows: FA=345.7 mm; FB=94.6 mm; FC=54.4 mm; and GA=70.1 mm.

Although alternatives are possible, it is noted that media 31 (and support 32 when used as shown) generally are conical, extending downwardly in outer size or perimeter, in extension between end 45 and end 46. A typical conical angle for media 31 and support 32 of the safety cartridge 16 is the same as, or greater than, the conical angle Z for the media 26 of the main cartridge 15. The conical angle for cartridge 16 is defined as the declination angle relative to the central axis, and is typically at least 0.2° larger than declination angle Z for the main cartridge 15.

Figure 6:
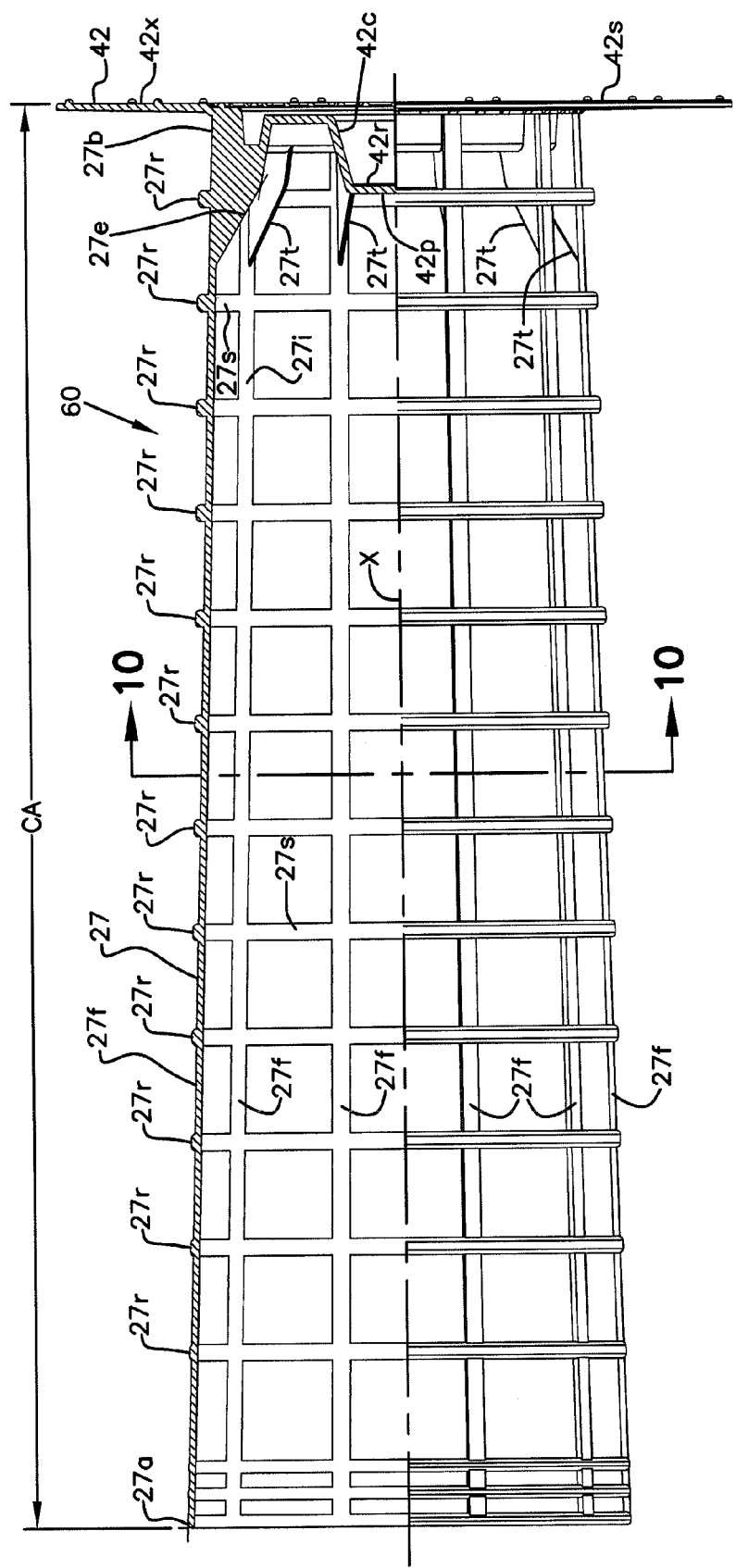
FIG. 6 is a schematic side, partially cross-sectional, view of a preform, including an inner liner section or component of the filter cartridge of FIG. 3.

Attention is now directed to FIGS. 6-11, in which features of a framepiece 60 (or preform) used in the formation of cartridge 15 are depicted. Attention is first directed to FIG. 6, in which preform or framepiece 60 is depicted in a side elevational view with portions shown in cross-section. The depiction in FIG. 6 is an orientation generally analogous to FIG. 3.

The framepiece 60 is generally referred to as "preform" in that it is formed prior to being put into the cartridge 15. It is generally a rigid structure, for example, molded from a plastic such as a polypropylene. Typically, a 20% glass filled polypropylene will be used for framepiece 60.

The framepiece 60 generally comprises (and defines) liner 27 and end 42. The liner 27 and end 42 are secured to one another. Typically, they are non-removably secured to one another, i.e. once the preform or framepiece 60 is made, the liner 27 and end 42 cannot be separated with damage to one or the other. A snap-fit construction can be used. In the example depicted they are integral, i.e. molded integrally with another, as portions of framepiece 60. This will be a typical construction, although alternatives are possible. In the construction that comprises framepiece 60, the liner 27 will sometimes be characterized as a liner section 27s; and, the end 42 will sometimes be characterized as end section 42s.

In general, liner 27 (or liner section 27s) is porous, i.e. has aperture or spaces therethrough. In the example it comprises a network (or lattice) of longitudinal supports 27f, interconnected by one or more radial ribs 27r. The longitudinal supports 27f generally extend between opposite ends 27a, 27b of the liner section 27s. Liner section 27s is, in the example depicted, generally conically shaped, with a wider perimeter end being end 27a, which would form an outlet end of the cartridge 15, FIG. 3. The conical angle or declination angle can be generally as defined previously for the cartridge at angle Z, FIG. 3.

End piece 42 (or end section 42s) generally has two sections: central section 42c which extends across an interior 27i of liner section 27s adjacent end 27b; and, exterior radial flange 42x which extends radially outwardly away from central axis X at end 27b, as an end support therein extending across an end (26b, FIG. 3) of the media 26. Typically support 42x extends completely across the media, although alternatives are possible.

Central section 42c is typically closed, i.e. solid and impermeable. In the finished cartridge 15, central section 42c will prevent air from entering through end piece 35 into cartridge interior 15i. Central section 42c for the cartridge 15 depicted, includes: central recess 42r that projects toward end 27a. The recess 42r is generally configured to receive, projecting therein, a portion of the access cover 3 as discussed below; and, to define a projection 42p that extends into recess 46t of the safety cartridge 16, as discussed below. The recess 42r is typically at least 5 mm deep, usually at least 10 mm deep preferably at least 15 mm deep, and in an example depicted and 15-35 mm inclusive, deep, in extension toward a first end 26a of media 26 (FIG. 2) from flange 42x or end 26b of media 26 (FIG. 2). (It is noted that recess 42r can be deeper).

The cartridge includes (typically within interior 27i of liner section 27s, adjacent end 27b) a plurality of (optional) spaced centering fins 27t. In the example depicted, there is one fin 27t positioned associated with each longitudinal extension 27f in the support structure or lattice that forms liner 27. Each fin 27t includes a radially inner edge 27e (FIG. 8) that tapers radially inwardly, i.e. toward axis X, in projection toward end 27b, or alternately stated toward end section 42 or end piece 35. The flanges 27t serve as centering fins or flanges, to help obtain proper alignment with end 46 of safety cartridge 16 during installation. This is described further below.

Figure 9:
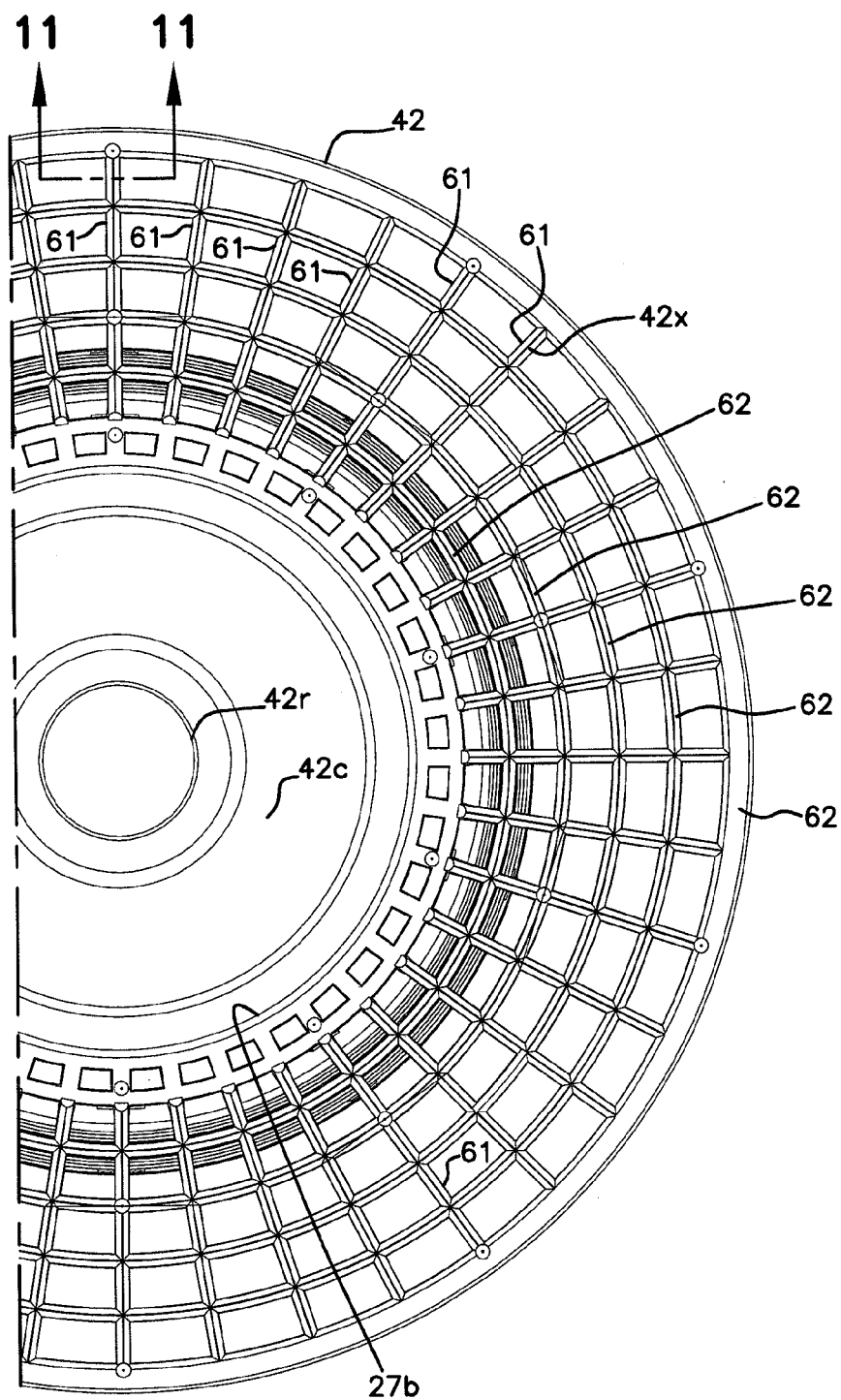
FIG. 9 is a schematic, fragmentary, end elevational view of a closed end of the preform component of FIG. 6.

Flange 42x, is generally a radially outwardly directed rim, formed as a porous support (in the example as a lattice comprising radially outwardly directed ribs 61, FIG. 9, and rings 62, FIG. 9). The porous structure (e.g. web structure) or lattice structure of end flange 42x, is positioned in axial overlap with (i.e. extends across, typically completely across) end 26b of the media 26, during formation of cartridge 15. Then overmold 40 can be molded-in-place, closing the end 26b of the media 26 by flowing through the porous apertures in the support (lattice of flange) 42x; and, securing the media 26 (and the lattice of region 42x) and perform or framepiece 60 together, at this location.

Figure 7:
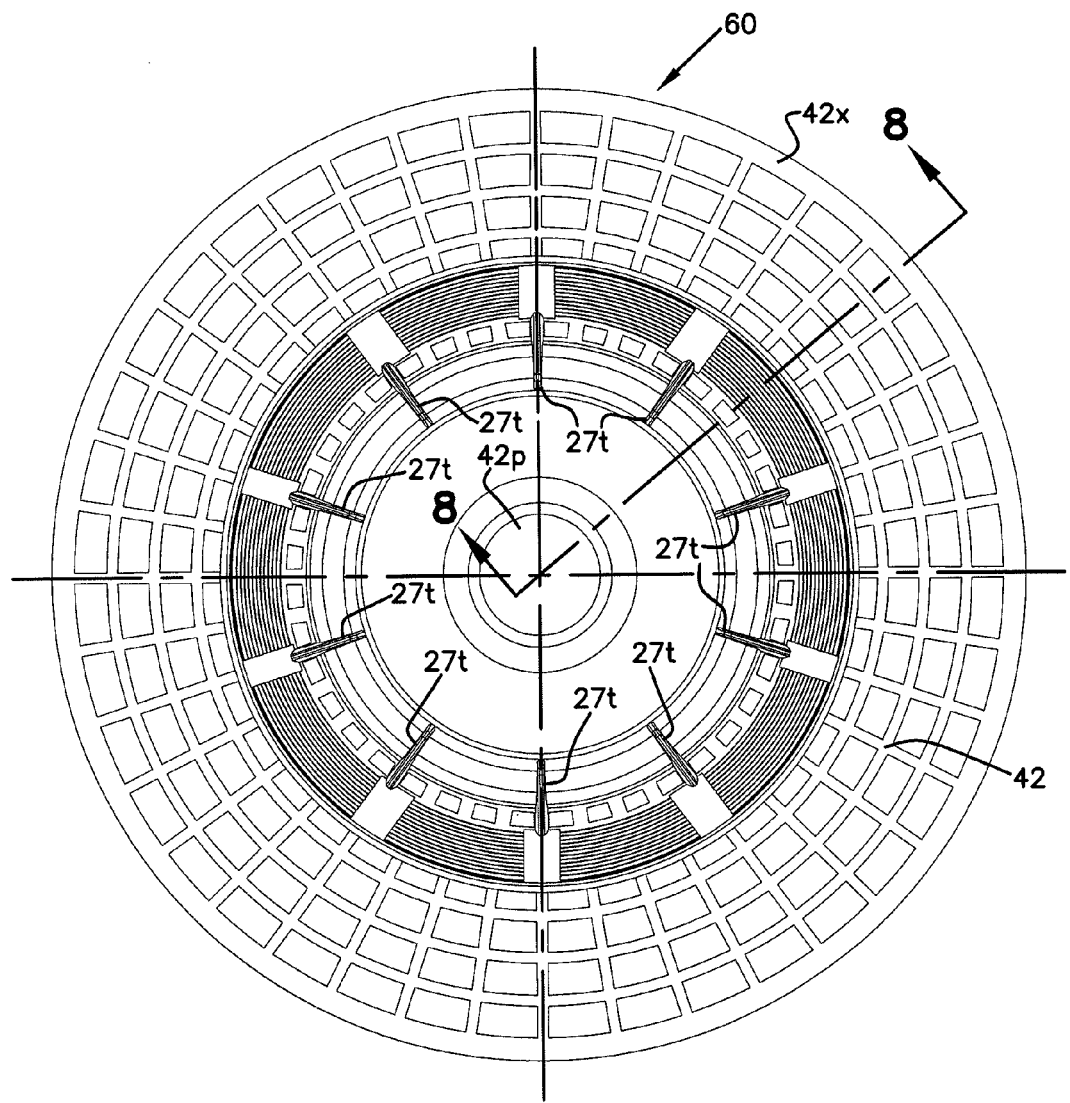
FIG. 7 is a schematic end elevational view taken toward an outlet end of the preform component of FIG. 6.
Figure 8:
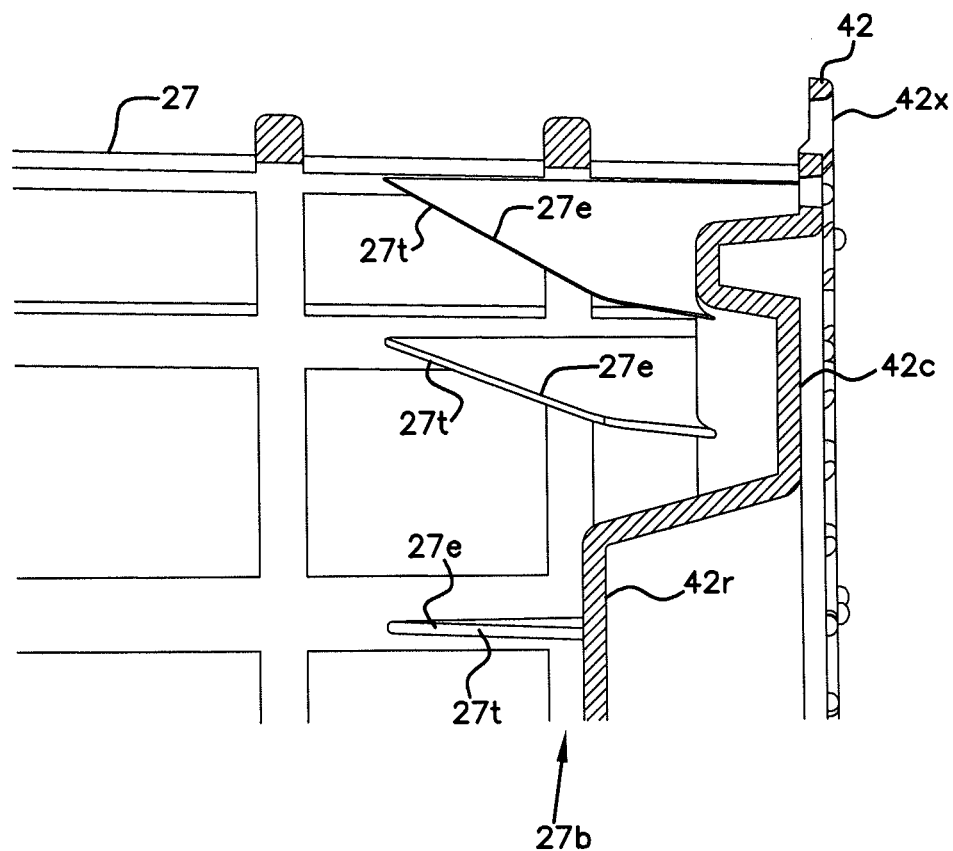
FIG. 8 is an enlarged, schematic, fragmentary cross-sectional view taken generally along line 8-8, FIG. 7.
Figure 10:
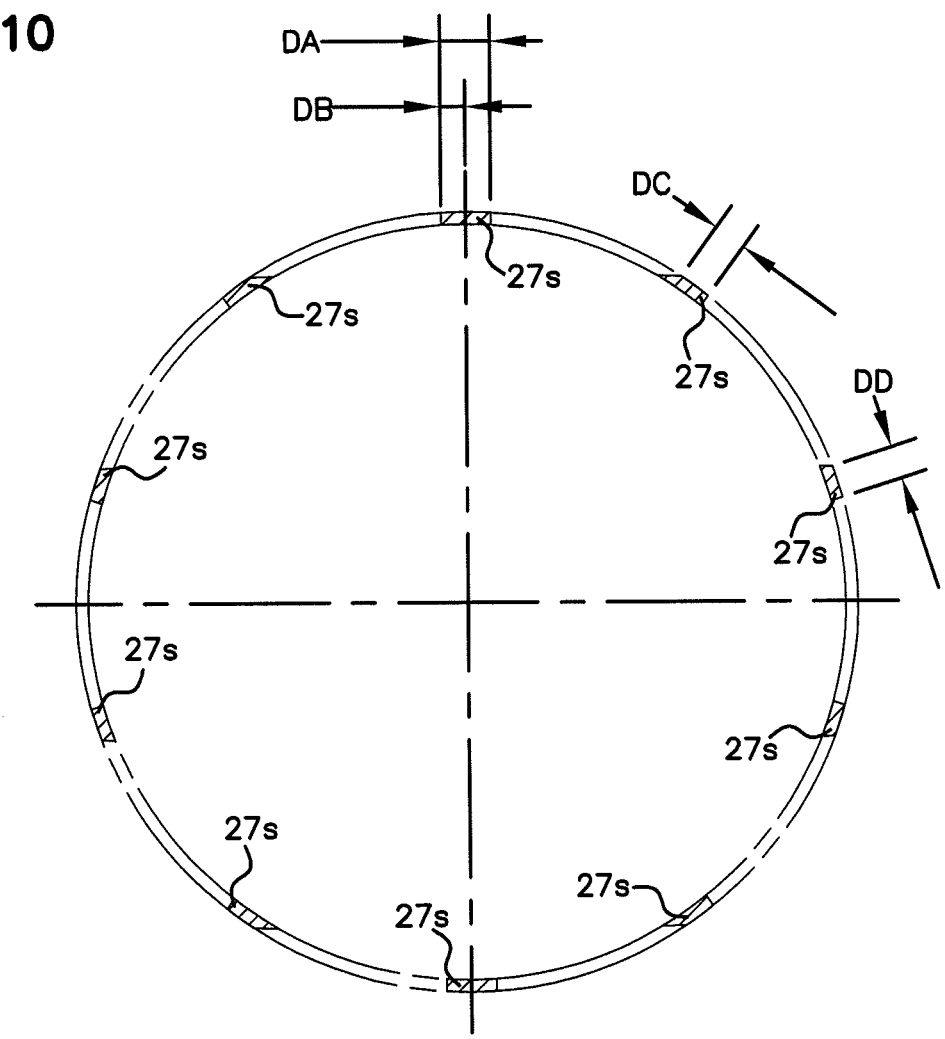
FIG. 10 is a schematic cross-sectional view taken generally along 10-10, FIG. 6.
Figure 11:
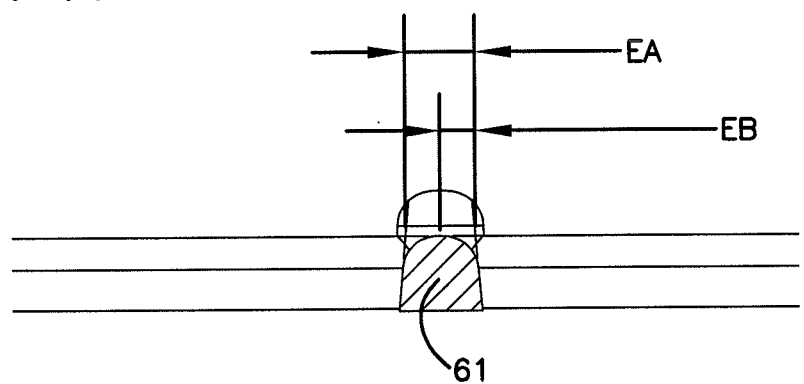
FIG. 11 is an enlarged, schematic, fragmentary view taken generally along line 11-11, FIG. 9.

In FIG. 7, an end view of framepiece 60 taken toward end 27a is provided. The porous lattice in region 42x can be viewed. In FIG. 8 an enlarged fragmentary view of a portion of framepiece 60, adjacent end 27b is depicted. In FIG. 9, a fragmentary plan view taken toward end 27b of framepiece 60 is provided. In FIG. 10, a cross-sectional view taken generally along line 10-10, FIG. 6, is provided. In FIG. 11, an enlarged fragmentary view of an identified portion of FIG. 9 is shown.

In FIGS. 6-11, some example dimensions are provided, as follows:

CA=340 mm; DA=6 mm; DB=3 mm; DC=4.1 mm; DD=4.0 mm; EA=1.5 mm; and, EB=0.75 mm.

Example use of the cartridges 15, 16, in assembly of air cleaner assembly 1, will be understood by reference to FIG. 2. Referring to FIG. 2, access cover 3 can be removed from a remainder 2a of the housing 2, for service access to an interior 2i of the housing 2. During assembly, safety or secondary cartridge 16 would be pushed into the resulting opening, in a direction toward end 2e, with end 45 of the cartridge installed first. End cap 50 would be pushed inside of flange 14f, so that outwardly directed radial seal ring 51 can engage an inner surface of flange 14f, sealing thereto.

The main cartridge 15 would then be pushed over the secondary or safety cartridge 16, with end 34 first installed and pushed toward end 2e. Eventually, radial seal region 34r of end piece 34 will engage an outer surface of flange 14f, releasably sealing thereto, with a radially inwardly directed seal. Centering fins 27t may engage end 46 of safety cartridge 16, if the safety cartridge 16 is out of alignment, pushing the safety cartridge 16 into a center alignment with central axis X. Projection 42p on main cartridge 15 will project into a recess 46x defined by the safety cartridge 16. The access cover 3 can then be installed.

When the access cover 3 is mounted, flange 20 will surround an exterior end 35 centering the cartridge 15 in place, and supporting the cartridge 15 against vibration. Also, access cover 3 includes a center projection 3p thereon, FIG. 2, which is projected into recess 42r on cartridge 15, and, as a result, into recess 46x on safety cartridge 16. This helps ensure that the cartridges 15, 16 are not only secured in place, but are proper and appropriate cartridges for the assembly 1 of concern Assembly of cartridge 15 would generally involve preparation of a (typically cylindrical) media pack, for media 26, and pushing it over end 45 of framepiece 60, until it engages end flange 42x. An overmold 40 of end piece 35 can then be used to seal end 26b of the media 26, and close the lattice of flange 42x. The liner section 27s of the preform 60 will bias the media 26 into the desired shape, including the conical definition if a conical shape is used. The end piece 34 can be molded-in-place as well. The specific order of molding of end piece 34 and overmold 40 is typically not critical however.

Safety cartridge 16 can be formed by positioning the media 31 in a mold, and forming (i.e. molding) the framework 32, for example from 20% glass-filled propylene. The end piece 51 can then be molded-in-place, for example, using a polyurethane foam.

The housing 2 can generally be configured to be molded from a plastic, such as a 20% glass-filled polypropylene. A variety of evacuator valve 6 can be used, in the example depicted, being well known "duck-billed" style valve, generally molded from flexible materials.

It is noted that the assembly can be construction not use a safety; and/or, can be construction such that the safety comprises a tower or framework non-removably secured within the housing, over which media is provided to generate the safety structure, when desired. If a safety is not desired, with such a configuration, a support lattice can be left in place, but without media thereover.

II. A Second Embodiment

FIGS. 14-30

In FIGS. 14-30, an air cleaner assembly and components are depicted, in the example optionally using selected ones of the principles and features described previously herein. In this section, application of the those principles in association with other selected principles and features are described.

Figure 14:
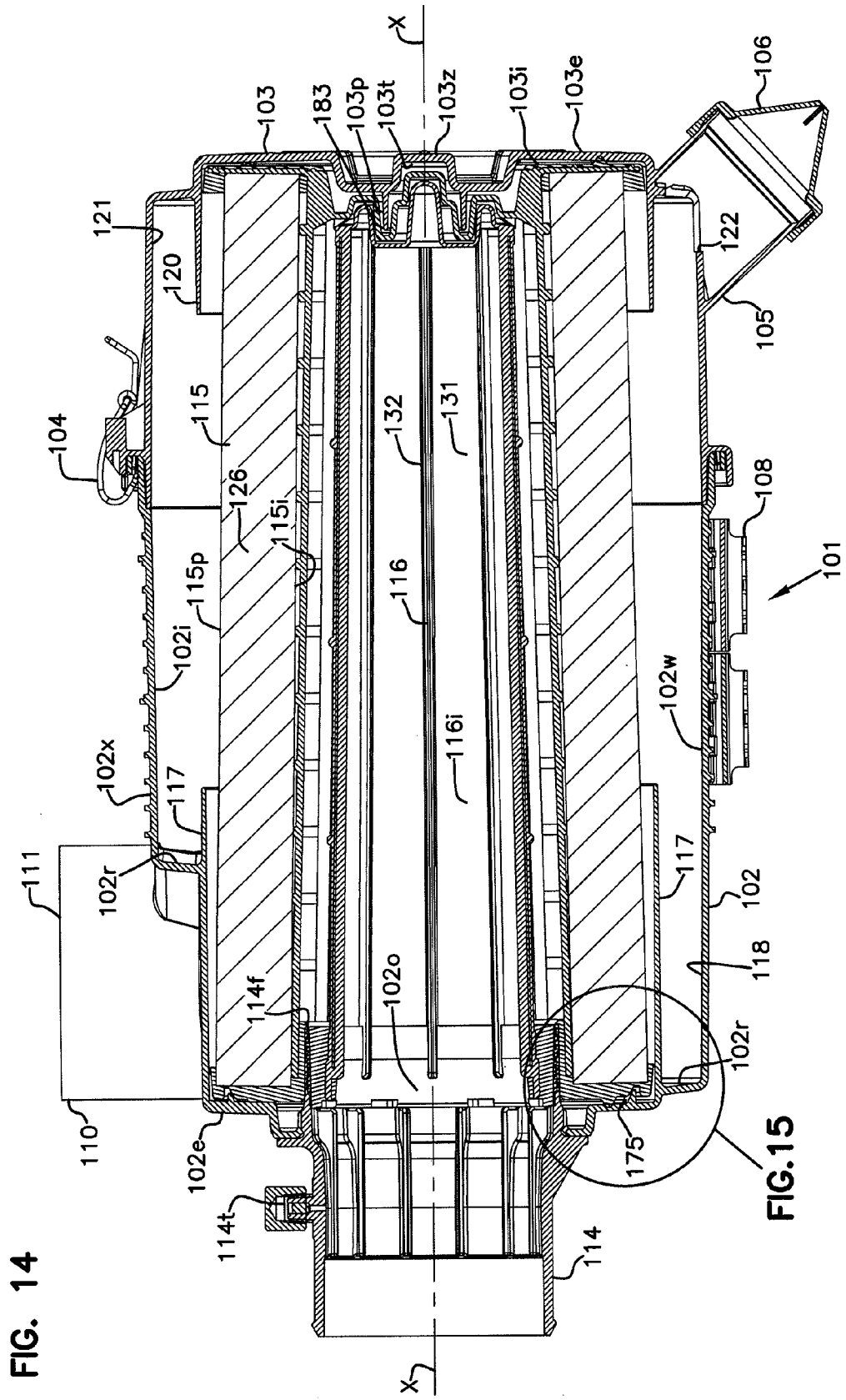
FIG. 14 is a schematic cross-sectional view of a second embodiment of an air cleaner assembly according to certain aspects of the present disclosure.

Attention is first directed to FIG. 14. In FIG. 14, reference numeral 101 generally indicates an air cleaner assembly according to second embodiment of the present disclosure. The assembly 101 generally comprises a housing 102. An end of the housing 102 comprises an access cover 103, removable from a remainder 102x of the housing 102 for service access to an interior at 102i thereof. The depicted access cover 103 is removeably secured to a remainder of the housing 102 by over center latches 104, although alternatives are possible.

Still referring to FIG. 14, as with the embodiment of FIG. 1, the housing 102 includes a downwardly directed ejector tube 105 closed by an evacuator valve 106. The particular housing 102 depicted, includes a base or mounting pad arrangement 108 to facilitate securing to equipment for use.

At 110 is a depicted an air inlet for the air cleaner assembly 101. As with the previous described embodiment, air to be filtered passes into open end 111 of inlet 110. Although alternatives are possible, the inlet 110 is a side inlet, and, in particular, it is tangential, in accord with such terms as previously defined. Although tangentially directed inlets are typical and preferred, alternate inlets can be used with principles according to the present disclosure.

Still referring to FIG. 14, housing 102 generally defines an interior 102i having a sidewall 102w preferably defining a generally circular cross-section through which inlet 110 extends. The housing extends between: a closed end 103e defined by the access cover 103; and, an opposite end 102e defined by housing section 102x. In the example assembly 101 depicted, the inlet 110 is positioned adjacent to, or closer to, end 102e than end 103e. End 102e has a central axial air flow outlet 102o therein by which filtered air leaves the housing 102 to be directed to downstream equipment. As previously defined for the embodiment of FIGS. 1-13, although alternatives are possible outlet 102o in the example depicted, is an axial outlet, in reference to cartridge and/or housing central axis X.

For the particular air cleaner assembly 101 depicted, on outlet 102o is positioned outlet tube 114. The outlet tube 114 is depicted secured in place on housing 102 by a snap-fit connection, although alternate arrangement s can be used. The particular outlet tube 114 includes a tap 114t to which a restriction indicator or other equipment can be secured. Also, tube 114 preferably includes an inwardly directed, tubular, circular flange 114f that extends inwardly of housing 102, i.e. into interior 102i, generally axially, toward end 103e. Similarly to flange 14f, flange 114f comprises seal flange surrounding axis X which provides: a radially (in the example outwardly) directed (facing) seal surface for engagement by a main filter cartridge 115; and, radially (in the example inwardly) directed (facing) seal surface for engagement by the safety (or secondary) cartridge 116. These cartridges 115, 116 and features relating to them are discussed further below. As previously defined herein, in this context, the term "radially inwardly" is meant to refer to a direction toward central axis X, and "radially outwardly" is meant to refer to a direction generally away from central axis X.

Still referring to FIG. 14, at 117 an optional inlet shield is depicted extending axially from end 102e towards end 103e surrounding the internally positioned cartridges 115, 116. The flange 117 analogous to flange 17, previously described, generally defines an air flow annulus 118 between the flange 117 and an outer wall 102w of housing section 102x, at least in a portion of the housing 102. Further, housing section 102x will generally be configured to define a cyclonic internal end ramp 102r around flange 117. Ramp 102r will generally direct inlet air flow into a cyclonic flow around central axis X, and towards end 103e, analogously to operation of ramp 2r, previously described, for a cyclonic preseparation or precleaner effect.

Still referring to FIG. 14, the housing 102 includes, on access cover 103, an optional second internal flange 120 surrounding an end of internally positioned cartridge 115, 116 and extending from end 103e axially toward end 102e. Flange 120 is analogous to flange 20, previously discussed, and defines, extending completely therearound annulus 121. In communication with annulus 121 is provided ejector port 122 which operates analogously to ejector port 22, previously described. Also, as will be understood from further description below, adjacent end 103e, the flange 120 surrounds, and can support in some applications, an end of internally positioned cartridge 115.

For the particular example assembly 101 depicted, flanges 117, 120 each surround and define and circular interior, and those interiors are (optionally) approximately the same size in diameter. Thus, typically the diameter of flange 117 is sized within the range of 0.85-1.15×, often 0.9-1.0× (usually 0.92-1.08×) an interior dimension (diameter if round) of flange 120. typically flanges 117 and 120 are the same, in some embodiment. As will be discussed further below, typically and preferably an external dimension of the cartridge 115, where the cartridge 115 is surrounded by the flanges 117, 120 is also approximately of the same type of definition, even when the media is conical.

Still referring to FIG. 14, attention is now directed to main filter cartridge 115. The main filter cartridge 115 is in many ways analogous to filter cartridge 15 and comprises media 126 positioned and surrounding enclosed cartridge interior 115i. As air passes through the media 126 from outer perimeter 115p, to interior 115i, it is filtered by passage through the media 126. The media 126, in the example depicted, is pleated media having inner and outer pleat tips, although alternative media is possible. Typically, the media 126 will be pleated with a pleat depth of at least 15 mm, typically at least 20 mm and often within the range 20-90 mm, inclusive, although alternatives are possible. The media can be as previously described for the embodiments of FIGS. 1-13.

After the air passes into interior 115i, it is directed through optional secondary or safety cartridge 116, in the example depicted, comprising media 131 supported by framework 132. After the air reaches interior 116i of optional safety cartridge 116, it is directed in the general direction of axis X toward end 102e and then outwardly from the housing 102 through outlet 102o (by flow into outlet tube 114). This operation, then, is generally analogous to the embodiment of FIGS. 1-13.

Figure 16:
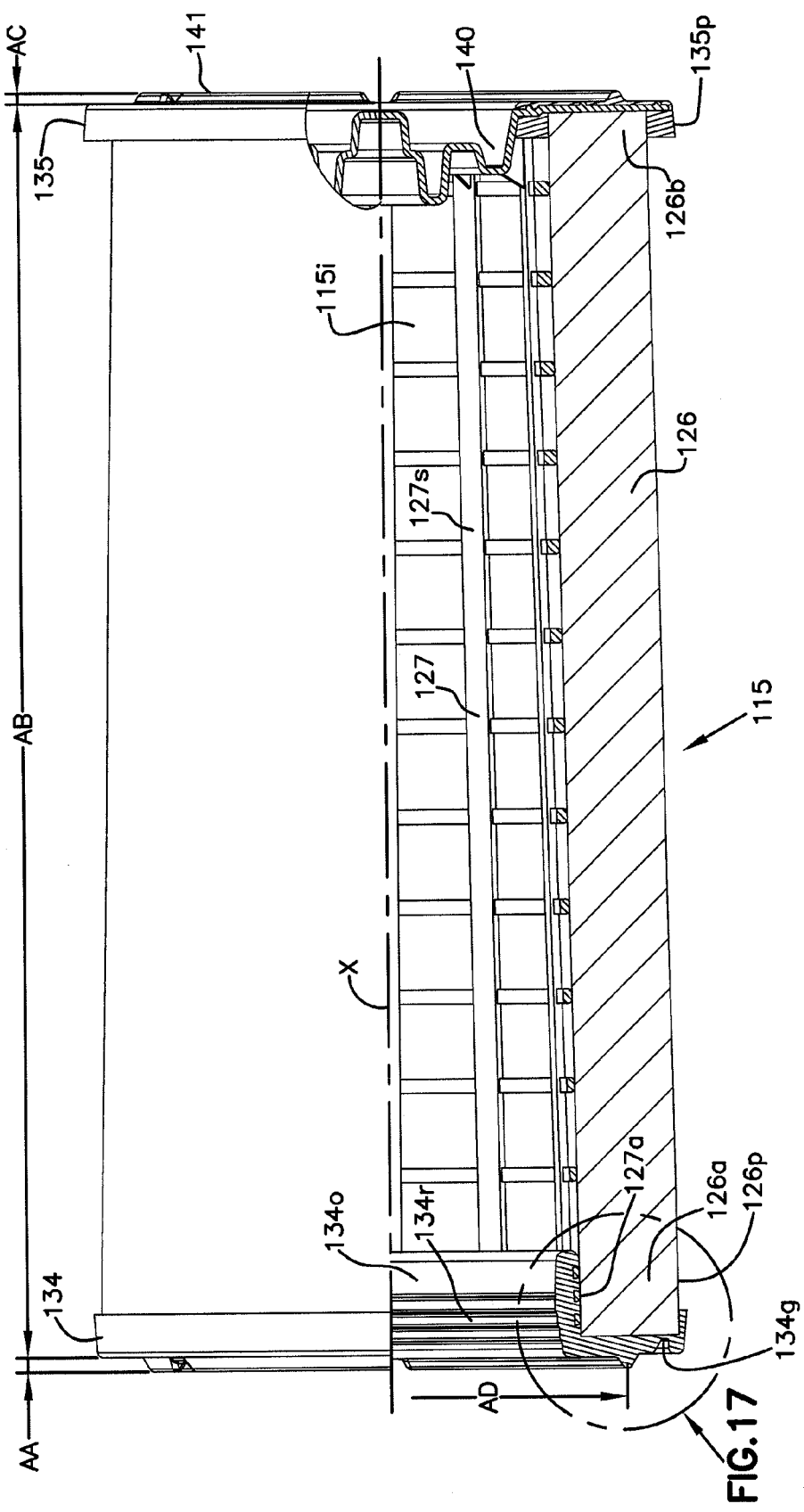
FIG. 16 is a schematic side elevation view of a filter cartridge component of the air cleaner assembly of FIG. 14.

Attention is now directed to FIGS. 16-19, with respect to main filter cartridge 115. In FIG. 16, the main filter cartridge 115 is generally depicted in side elevational view, with portions depicted in cross-section for viewing of internal detail. The main filter cartridge 116 comprises media 126 positioned in extension between opposite (first and second) end pieces 134, 135. In the example depicted, the media 126 is positioned around optional and preferred (interiorly positioned or disposed) inner liner (or liner section) 127. Typically the inner liner section extends completely between the end pieces 134, 135 but alternatives are possible. End piece 134 is an open end piece defining outlet aperture 134o through which filtered air can leave cartridge 115 in a general direction toward outlet 102o, FIG. 14.

For the particular cartridge 115 depicted, an outer cross-sectional dimension of end pieces 134, 135 is approximately the same, i.e. if circular they have approximately the same diameter and perimeter. Typically and preferably, the outer cross-sectional size of end piece 134 is the same as the outer cross-sectional size of end piece 135 or the cross-sectional size of end piece 134 is within the range 0.85-1.15× (or times), typically 0.9-1.1×, usually 0.92-1.08× and in the example 0.95-1.05× the outer dimension of end piece 135, when the media pack is conical.

The particular cartridge 115 depicted, includes a portion of end piece 134 defining a radial (housing) seal 134r. This seal can be analogous to seal 34 discussed in connection with the embodiment of FIGS. 1-13. The particular housing seal 134r depicted, is positioned in radial overlap with the first end 126a of media 126. In the particular example, radial seal 134r is surrounded by the media 126 at end 126a and is a radially inwardly directed seal, analogously to seal 34r. In general terms, the depicted seal 134r is positioned so that a cross-section therethrough, in a direction perpendicular to central axis X, also passes through a portion of media 126.

It is noted that the inwardly directed seal can seal against a portion of an outlet tube, or other structure within the housing, as desired. The function is to inhibit unfiltered air from reaching an interior of the outlet tube 114.

For the particular cartridge 115 depicted, preferably end piece 134 is a molded-in-place end cap. The end piece 134 will typically comprise an adequately soft polymeric material capable of forming the good seal at end 126a of the media 126, and also to define a strong robust housing seal region 134r. A foamed polyurethane as previously described for the FIGS. 1-13 can be used for this.

For the particular cartridge 115 depicted, liner (or liner section) 127 has an end 127a which is overlapped by the material from which the end piece 134 is molded. Thus, a portion (end) 127a of the liner 127 is positioned between seal 134r and media 126. This portion 127a of the liner 127 both supports the media 126 against bias toward central longitudinal axis X and provides a back-up or support to seal 134r of the end piece 134 as it is pressed outwardly during sealing; i.e. in the example depicted when pushed over flange 114f, FIG. 14.

Figure 17:
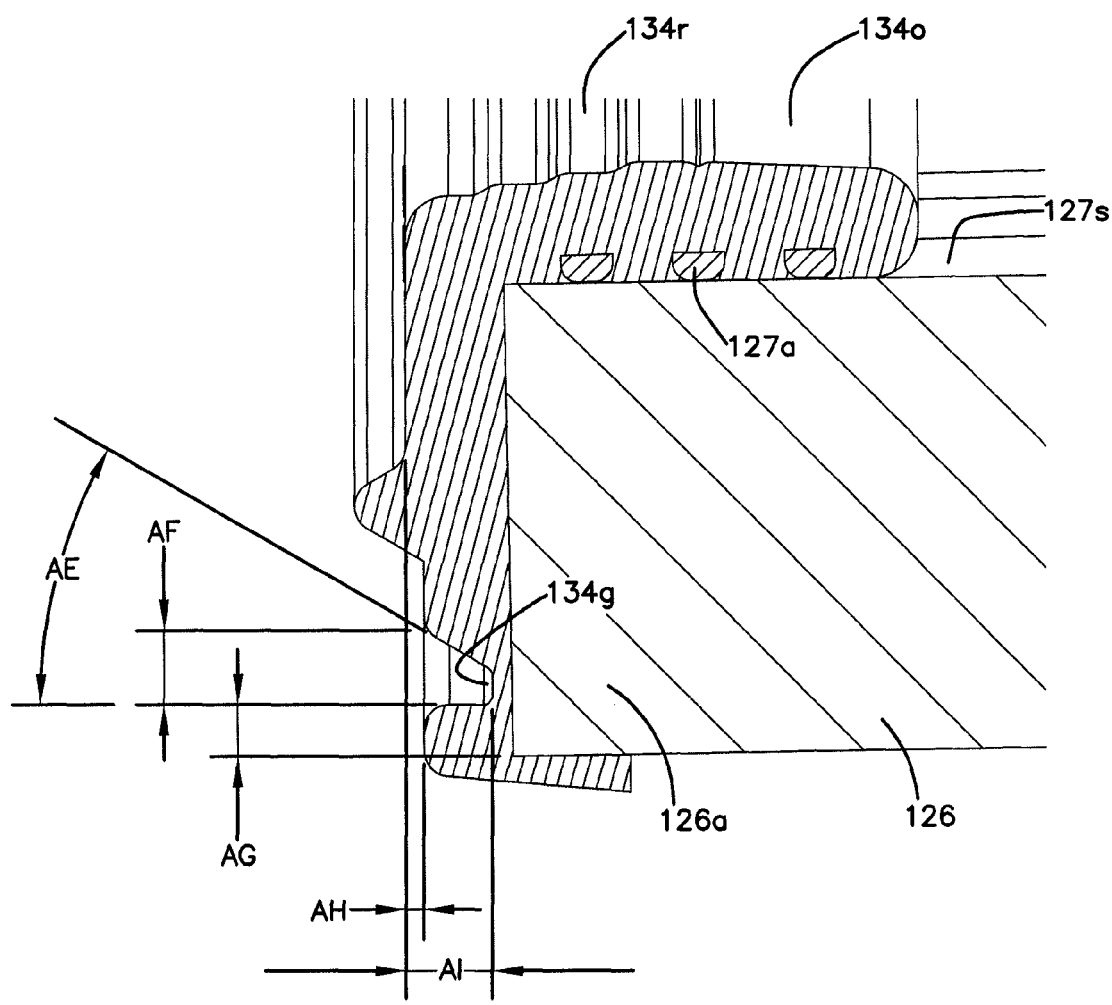
FIG. 17 is an enlarged schematic fragmentary view of an identified portion of FIG. 16.

Attention is directed to FIG. 17, an enlarged fragmentary cross-sectional view of an identified portion of FIG. 16. By reference to FIG. 17, it can be understood that end piece 134 includes therein, receiver groove or recess 134g. This recess or groove 134g, discussed in more detail below, is not present in the depicted embodiment of FIGS. 1-13; however an analogous one would be used with such an embodiment.

Referring again to FIG. 16, opposite end 126a, media 126 defines a second end 126b adjacent end piece 135.

As with the embodiment of FIGS. 1-13, although alternatives are possible (for example cylindrical), the particular media 126 depicted, is configured in a conical fashion in extension from end piece 134 to end piece 135; i.e. in extension between first media end 126a and second, opposite, media end 126b, with the media 126 depending downwardly in outer perimeter size, in extension from first end 126a toward second end 126b. The liner 127 (or inner liner section 127s) also preferably defines a shape that tapers downwardly in size, from an end adjacent end cap 134 toward an end adjacent 134 to accommodate a conical shape and media pack 126, and, to facilitate forming the media 126 into a conical pattern as shown, during cartridge assembly. This is generally analogous to the previously described embodiment.

Still referring to FIG. 16, end piece 135 is a closed end piece, i.e. there is no aperture therethrough in communication with interior 115i of cartridge 115. In general, as with the previously described embodiment, the end piece 135 comprises two components: a frame portion 140 and an overmold 141. The overmold 141, analogous to overmold 41, previously described, is typically molded-in-place and provides that the media 126 is sealed at end 126b, while also securing liner section 127s in position. The frame portion 140 is typically non-removably secured to, and in a typical construction is integral with, inner section 127s (or liner 127). Herein, when it is said the inner section 127 and frame portion 140 are non-removably secured together, it is meant that they cannot be separated be without damage to one or the other. An example would be a snap-fit connection, not shown. Herein, when it is said that the liner 127 (or liner section 127s) and the frame portion 140 are integral or formed integral, it is (again) meant that they are molded together as a single preform and are thus, again, non-removably secured together. This is analogous to the embodiment described above for FIGS. 1-13, and analogous materials can be used.

Referring to FIG. 16 and as described for the cartridge 15 of the embodiment of FIGS. 1-13, the depicted cartridge 115 does not include an (optional) outer liner surrounding the media 126 in extension between the end pieces 134, 135. While this is preferred, alternatives can be used. Further the cartridge 115 is devoid of any (optional) shield or perform material, i.e. material other than molded-in-place portions of end caps 134, 135, that extends around an outside of the media 126, whether in continuous extension between the end pieces 134, 135 or only partial extension therebetween. This too is preferred, although alternatives are possible. Thus, in a typical preferred application, the terms "axial outer liner free" and "outer shield free" can be applied to cartridge 115 as depicted, analogously to cartridge 15.

Further, cartridge 115 depicted is typically "outer adhesive coil free" as the term was defined above in connection with the description of cartridge 15, although alternatives are possible.

In general, the "conical angle" of media 126 can be generally in accord with the conical angle of media 26 previously discussed at angle Z. Typically it is at least 0.2°, usually for each embodiment, it is not more than 10°, (often not more than 5° or 6°) and often within the range of 0.2-6°, inclusive (for example 0.4-4°).

Figure 18:
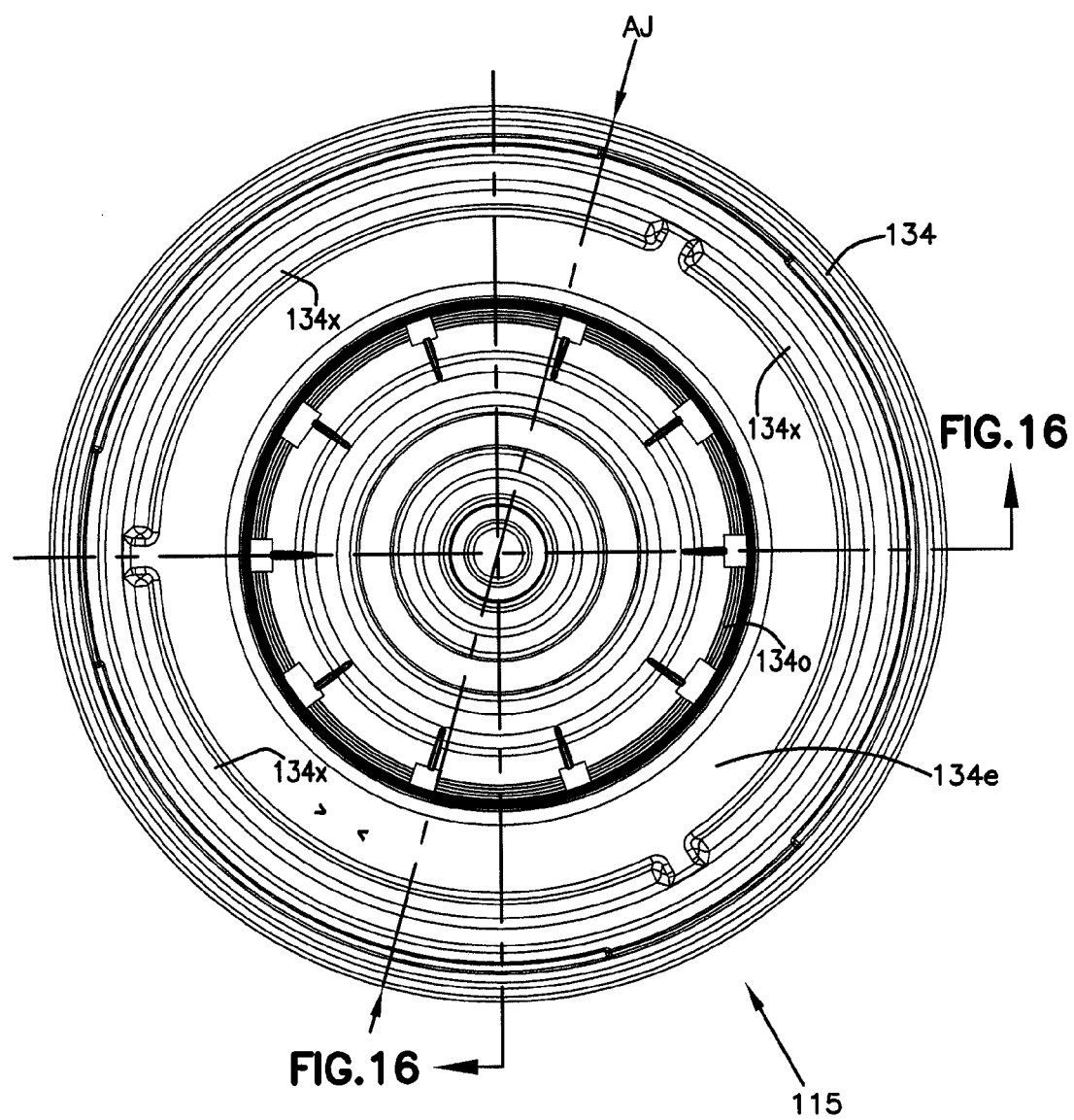
FIG. 18 is an open end elevational view of the filter cartridge of FIG. 16.

In FIG. 18, an end view of cartridge 115 is depicted, taken toward end piece 134. It is noted that outer end surface 134e of end piece 134 includes, molded integrally therewith, spaced ribs 134x. These ribs form axial end bumpers, analogous to ribs 34x previously described.

Figure 19:
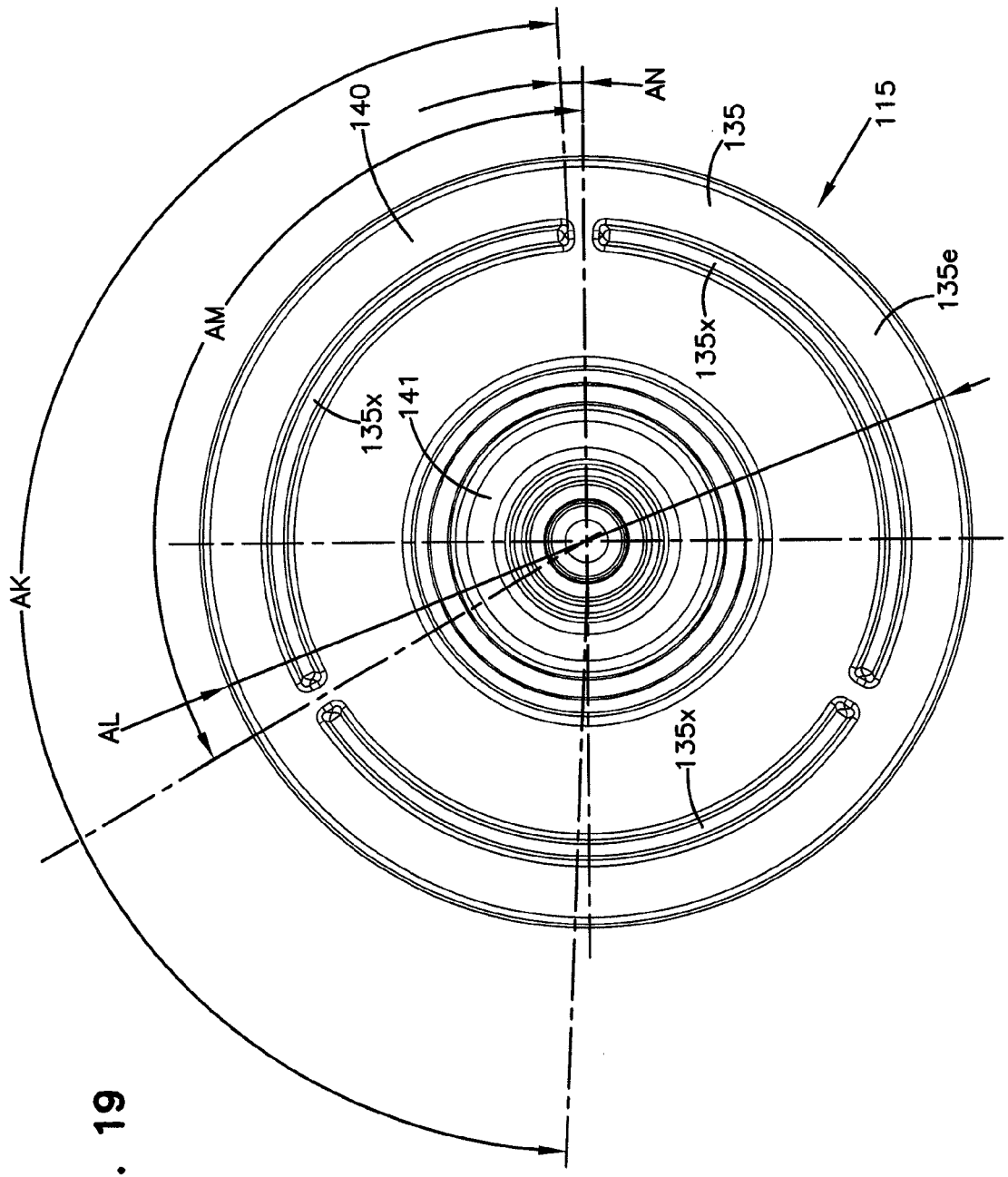
FIG. 19 is a closed end elevational view of the filter cartridge of FIG. 16.

In FIG. 19, an end view toward end piece 135 is depicted. Outer end 135e of end piece 135 also is depicted as including spaced ribs 135x, which, analogously to ribs 35x, previously described serves as bumpers to engage end 103e of access cover 103, FIG. 14, during installation.

Figure 25:
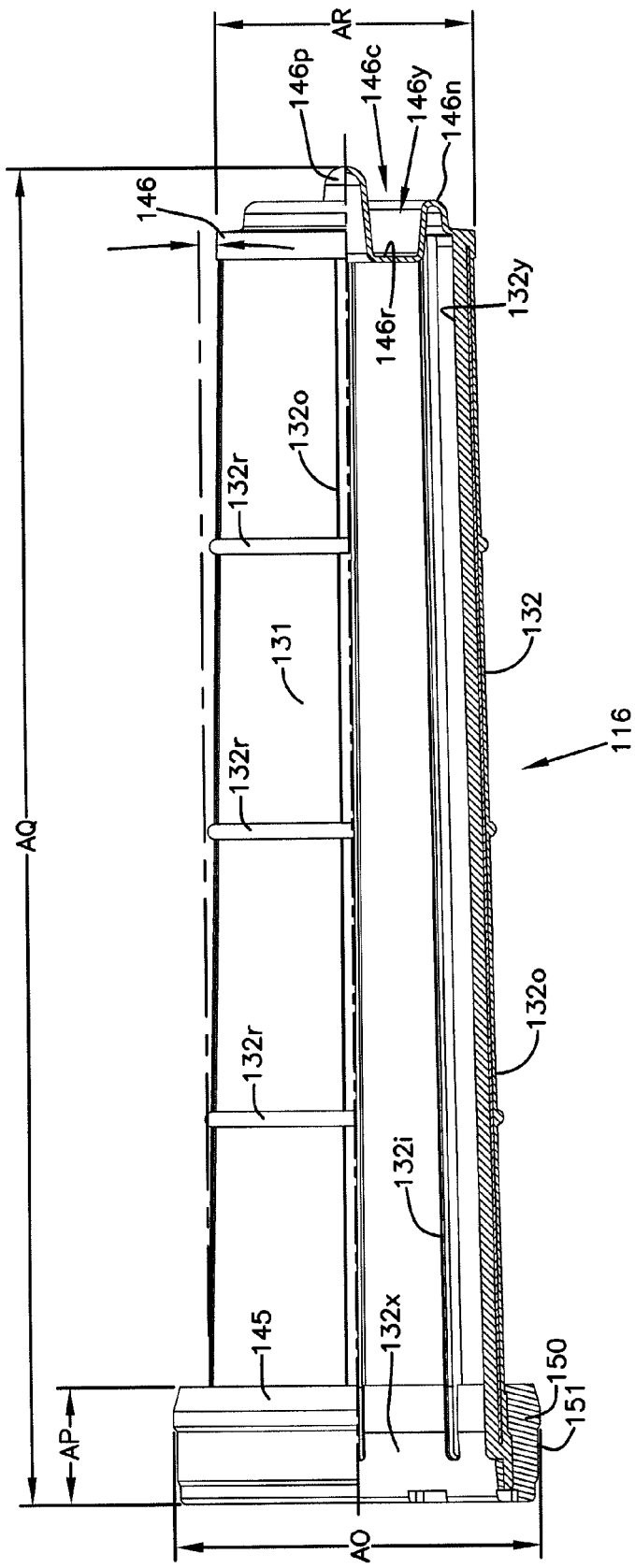
FIG. 25 is a side elevational view of a secondary or safety filter component of the assembly of FIG. 14.

Attention is now directed to FIGS. 25-28, with respect to the secondary or safety cartridge 116. In FIG. 25, a side view of the secondary or safety cartridge 116 is depicted, with portions shown in cross-sectional view for understanding internal detail and construction.

Referring to FIG. 25, optional or safety cartridge 116 comprises a framepiece, tower or support 132, which extends between opposite ends 145, 146. The support, tower or framepiece 132, as will be understood from detailed description further below, is configured for preferable interaction with the main cartridge 115 in the assembly 101.

The particular cartridge 116 depicted, is configured such that the framepiece, tower or support 132, supports optional media 131. The media 131 would typically be a conically shaped extension of the thin non-pleated (usually non-woven) media, although alternatives are possible. For the particular example depicted, media 131 is secured within framework 132, with the framework 132 molded-in-place with the media 131 secured therein.

It is noted that in some alternate applications and principles according to the present disclosure, the support 132 can provide advantage (with respect to engagement with the main cartridge 115) in the absence of media 131. When this is the case, the structure 132 is a tower or support that is not necessarily part of a safety cartridge. Indeed, the tower 132 can be non-removably positioned in the housing 102 if desired. However, when the tower 132 is non-removably positioned in the housing, it can be configured as a safety construction or cartridge by having media positioned (for example removably) over the tower.

The framework 132 includes, extending between ends 145, 146, outer supports 132o and inner supports 132i. Each is configured to support the media 131 while providing an open, porous, structure for the support 132.

Figure 26:
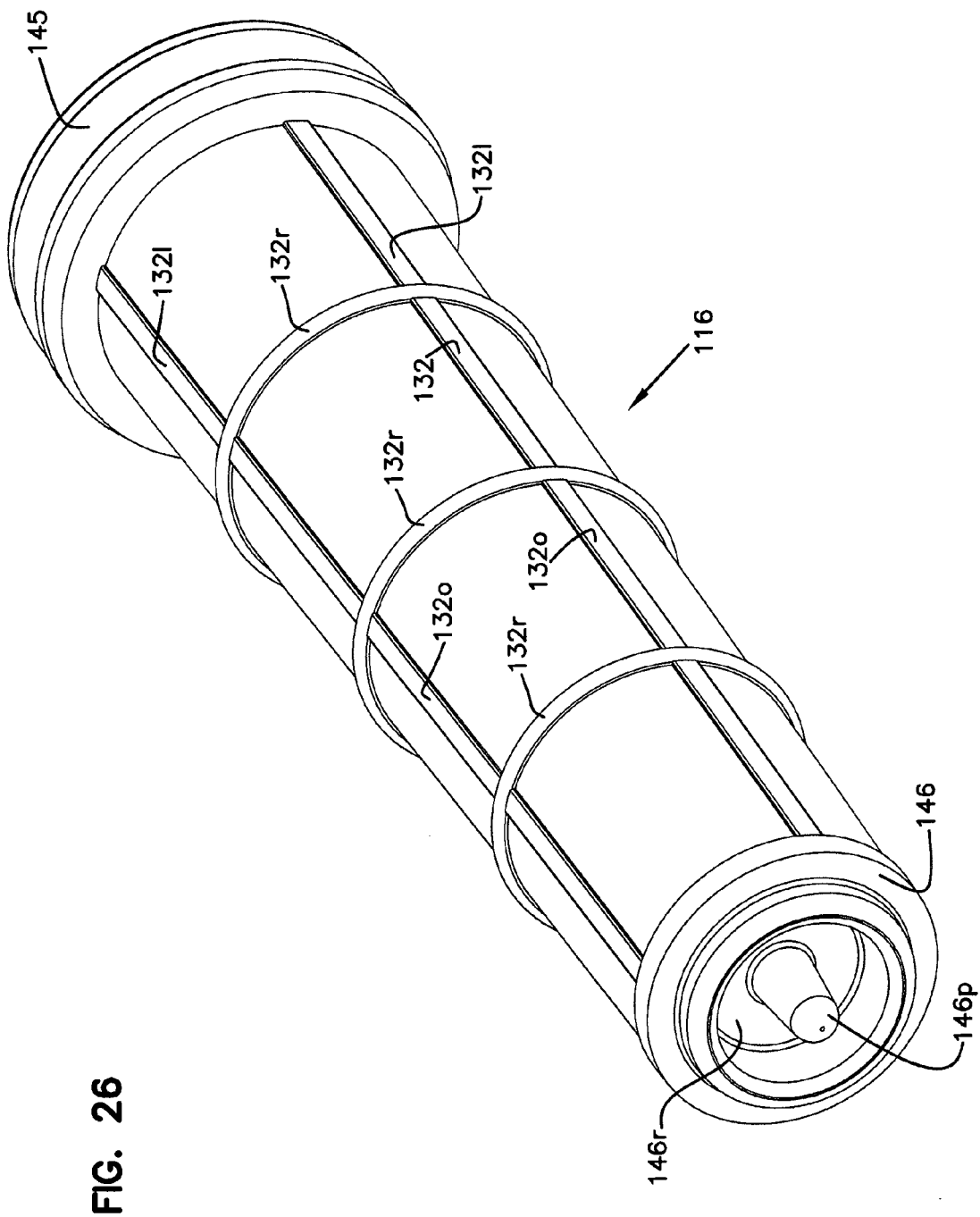
FIG. 26 is a schematic perspective view of the safety cartridge component of FIG. 25.

In FIG. 26, a perspective view of cartridge 116 is viewable. The support 132 can be seen as including a lattice structure formed from outer supports 132o, with longitudinal supports 132l inter connected by ribs 132r.

Referring again to FIG. 25, end 145 is an open end, with an outlet opening 132x therein. Molded-in-place on end 145 is positioned end piece 150. End piece 150 includes and defines an outer annular surface 151 which defines an (in the example outwardly directed) radial (housing) seal, for sealing engagement with the (in the example radially inwardly directed inner surface of) flange 114f, FIG. 14. End piece 150 is typically molded-in-place, for example from a polyurethane form, such as a foamed polyurethane foam previously described. As thus far characterized, cartridge 116 is generally analogous to cartridge 16, FIGS. 1-13.

End 146 is a closed end and generally comprises a portion of the molded framework, tower or support 132. The end 146 includes various features discussed herein below further, in extension thereacross. In general, the end 146 includes a closed central section 146c that extends across and closes interior 132y, adjacent end 146. The particular contour within region 146c provides advantage, discussed below.

Also, although alternatives are possible, it is noted that for the safety cartridge 116, the media 131 and support 132 generally are conical, extending downwardly in outer size or perimeter in extension from end 145 to end 146. The typical conical angle for media 131 and support 132 of the safety cartridge 116 is the same as, or greater than, the conical angle Z (as defined herein) for the media 126 of the main filter cartridge 115. The conical angle from main cartridge 115 is defined as the declination angle relative to the central axis X and is typically at least 0.2° larger than the declination angle (Z) for the main cartridge 115.

Figure 20:
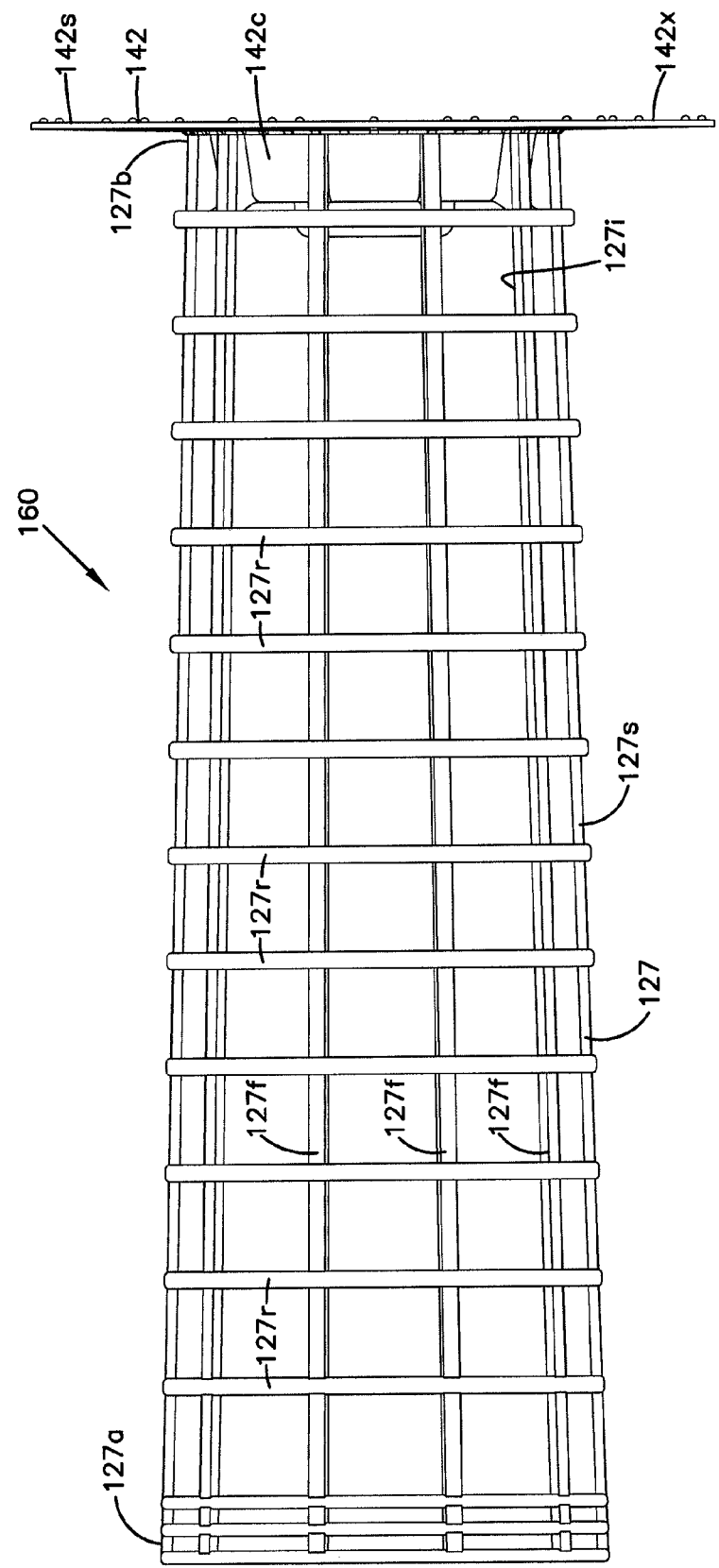
FIG. 20 is a schematic side elevational view of a liner component of the filter cartridge of FIG. 16.

Attention is now directed to FIGS. 20-24, in which features of the framepiece 160 (or preform) used in the formation of cartridge 115 are depicted. Attention is first directed to FIG. 20, in which preform or framepiece 160 is depicted in side elevational view. The depiction in FIG. 20 is generally an orientation analogous to FIG. 16.

The framepiece 160 is generally referred to as "preform" in that it is formed prior to being put into cartridge 115. It is generally a rigid structure, for example, molded from a plastic such as polypropylene. A plastic similar to that used for framepiece 60 previously described, can be used.

The framepiece 160 generally comprises (and defines) inner liner (or liner section) 127 and (optionally) end (piece or support) 142. The inner liner 127 and end 142 are secured to one another, typically non-removable, for example molded integrally with one another as portions of framepiece 160. Although this is a typical construction, alternatives are possible. In the construction that comprises framepiece 160 of FIG. 20, the liner 127 will sometimes be characterized as liner section 127s; and, the end (piece) 142 will sometimes be characterized as an end section 142s.

In general, liner 127 (and liner section 127s) is porous, i.e. comprises a network (or lattice) of longitudinal supports 127f interconnected by radial ribs 127r. The longitudinal supports 127f generally extend between opposite ends 127a, 127b of the liner section 127s. Liner section 127s is generally conically shaped with a wider perimeter end being end 127a, which forms an outlet end of the cartridge 115, FIG. 16. A conical angle or declination angle can be generally as defined previously for the cartridge 116.

End piece 142 (or end section 142s) generally has two sections: central section 142c, which extends across an interior at 127i of liner section 127s adjacent end 127b; and, exterior radial flange 142x which comprises a support that extends radially outwardly away from central axis X at end 127b.

Central section 142c is typically closed, i.e. solid and impermeable. In the finished cartridge 115, central section 142c will prevent air from entering though end piece 135 into cartridge interior 115i. Central section 142c for the cartridge 115 depicted includes optional contouring as discussed below.

Figure 22:
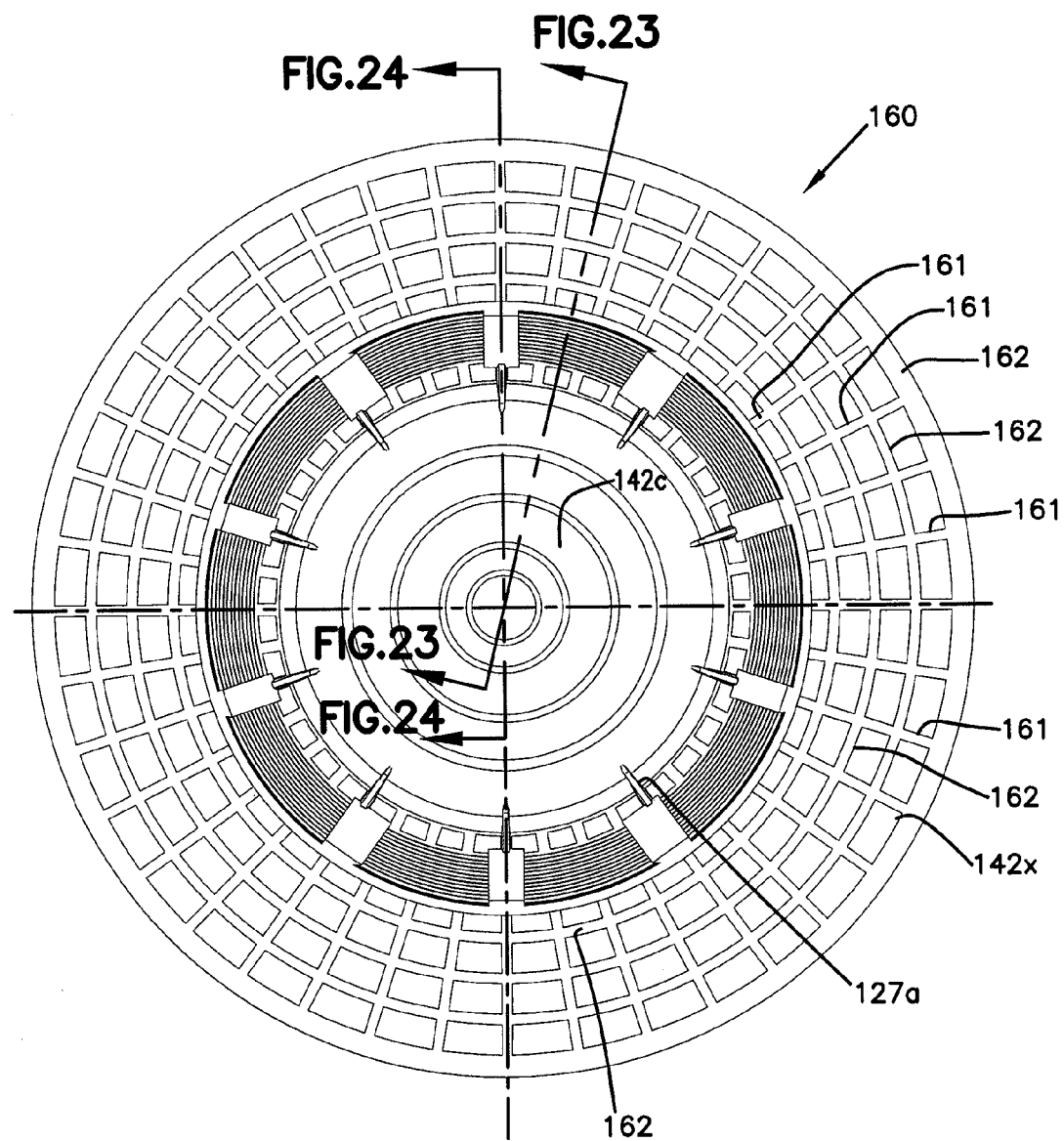
FIG. 22 is an end elevational view of an open end of the liner component of FIG. 20.

Attention is now directed to FIG. 22, an end view of preform 160 taken toward end 127a. One can see that end section 142c is closed. One can also see that radial flange or support 142x is open (porous), although alternatives are possible. In the example, flange 142x comprises a lattice of radially outwardly extending ribs 161 interconnected by rings 162.

Figure 21:
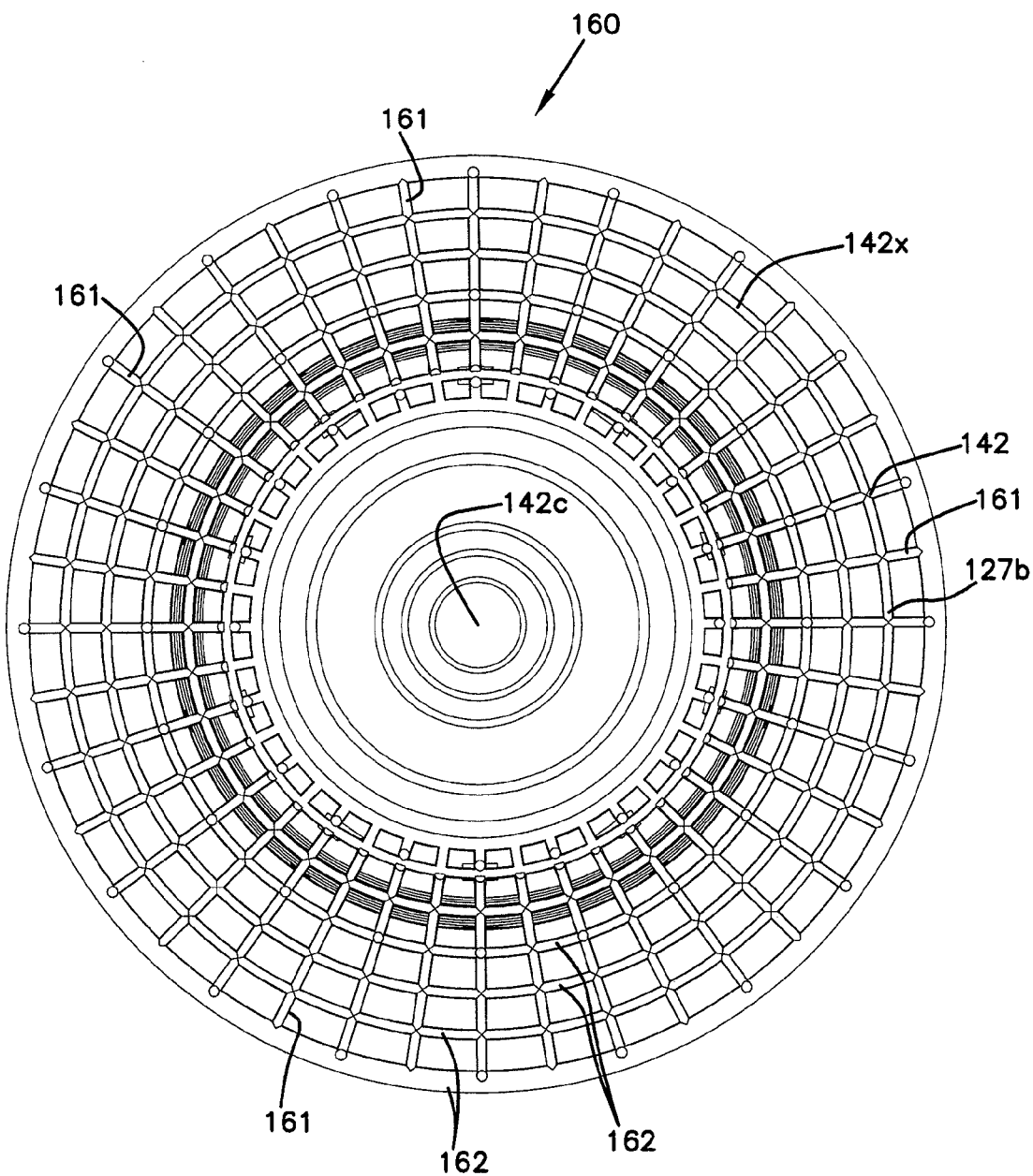
FIG. 21 is an end elevational view of a closed end of the liner component of FIG. 20.

In FIG. 21, an end view is taken toward end 127b and again closed central section 142c and open perimeter flange 142x can be seen.

Referring to FIG. 20, it is noted that the flange or support 142x does not include any axially directed shield or ring that would surround the media. Although this is typical, in the alternative, flange 142x can include an outer shield perimeter or ring sections that surrounds the media.

The support 142x extends across on end of the media. Typically, it extends completely across an end of the media, but alternatives are possible.

Figure 23:
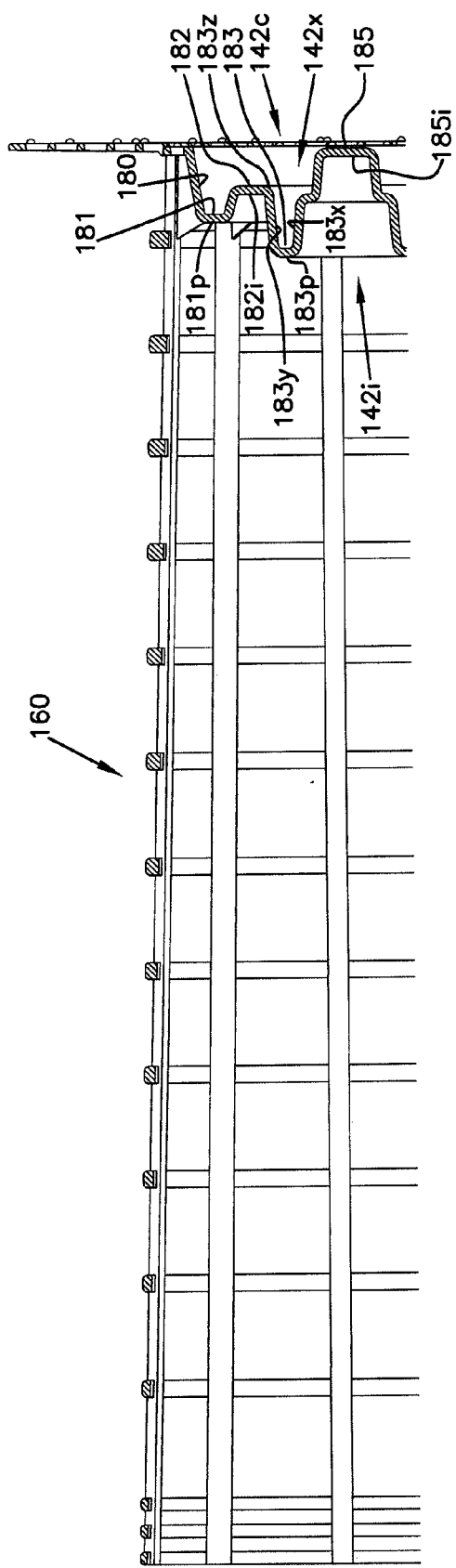
FIG. 23 is a schematic fragmentary cross-sectional view taken generally along line 23-23, FIG. 22.
Figure 24:
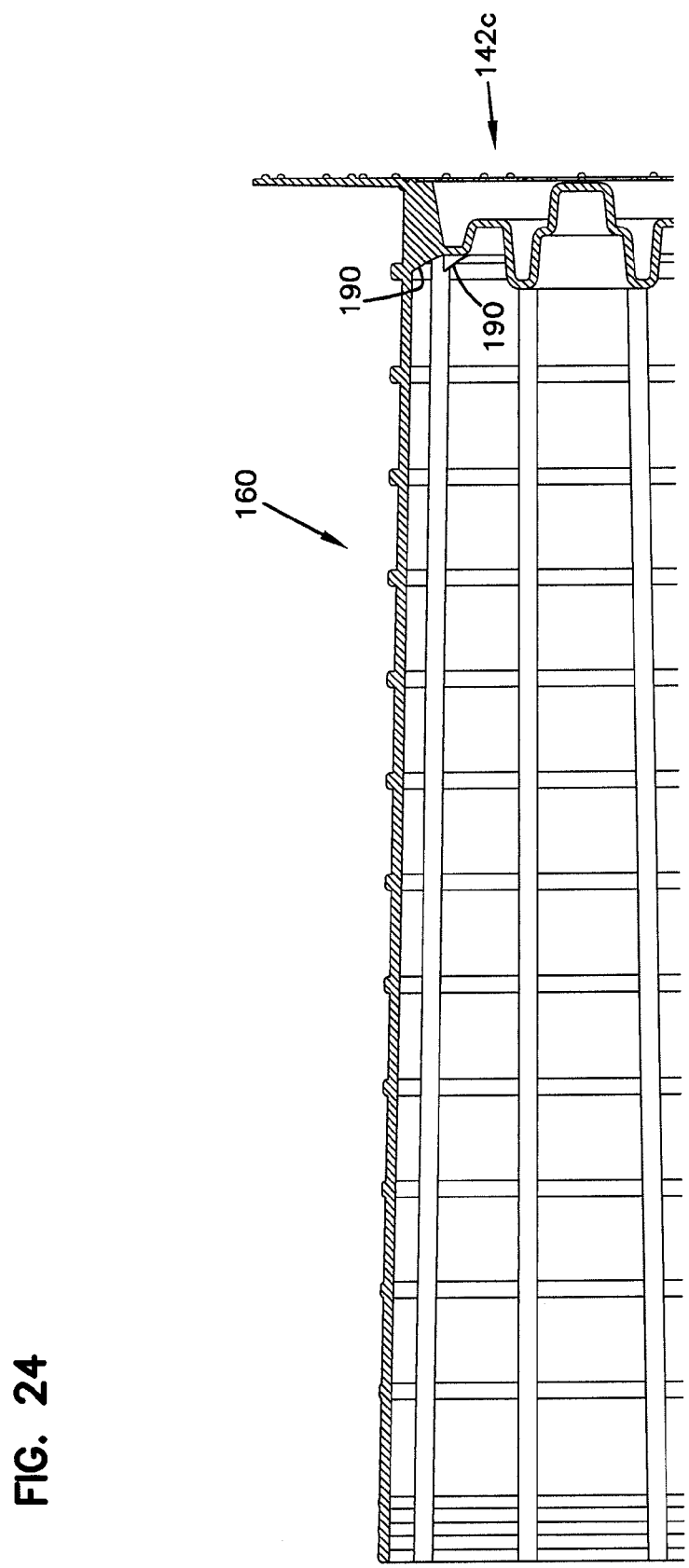
FIG. 24 is a schematic fragmentary cross-sectional view taken generally along line 24-24, FIG. 22.

FIG. 23 is a schematic fragmentary cross-sectional view taken generally along line 23-23, FIG. 22. Contouring of region 142c can be seen. Also FIG. 24 is provided, which is a fragmentary cross-sectional view taken generally along line 24-24, FIG. 22. Further detail regarding contouring in region 142c can be seen. Again, this contouring is discussed in more detail below.

Attention is now directed to FIGS. 16 and 17 and in particular to end piece 134. As previously discussed, typically end piece 134 is molded-in-place, for example from a polyurethane foam as described. Features previously characterized of end cap 134 are: internal radial seal region 134r surrounding aperture 134o, and, optional outwardly projecting bumpers 134x. Also, as previously identified, is provided optional receiving groove or recess 134g.

At this point, further description and discussion is provided regarding the groove 134g and an outer peripheral portion 134p of the end cap 134.

Attention is first directed to groove 134g. The groove 134g is positioned somewhat analogously to a groove discussed in PCT publication WO 2006/119414 A1, incorporated herein by reference, with respect to an outer perimeter of the media 126. The particular groove 134g is typically positioned with an axial overlap with a media 126, and is usually positioned over the deepest portion thereof, no more than 7 mm and typically no more than 5 mm, often an amount within the range of 1-4 mm, from an outer pleat tip region 126o. The groove 134g is typically at least 1.5 mm deep, often at least 2 mm deep, usually at least 3 mm deep and sometimes an amount within the range of 4-7 mm deep, from a closest adjacent axial surface portion of surface 134e. The groove 134g provides for several benefits, one of which is a preferred interaction with the housing, viewable in FIGS. 14 and 15 to advantage. In addition, the groove can be an artifact from a mold stand-off, which isolates an outer perimeter region of the urethane during rise and cure, around an outer perimeter of the media pack. This can help provide good control of the urethane rise in this region, which is advantageous for managing minimal radial outward urethane shape.

In a typical application, dimensions across end piece 134 correspond generally to a diameter (if round) is at least about 100 mm, typically at least 130 mm, often not more than 350 mm, for example 100-350 mm, and often within the range of 130 mm-250 mm, inclusive, although alternatives are possible. The groove 134g, on the other hand, is typically positioned, as a percentage from the outer media perimeter 126p in region 126a toward central axis X, a distance corresponding to no more than 20% of a distance from outer perimeter 126p of the media at end 126a to central axis X, typically no more than 10% of this distance and usually an amount within the range of 1-9%, inclusive, this distance. When such a characterization is made about the deepest groove in this manner, reference is meant to the deepest portion, toward the media and specifically, to a radially outermost edge of the deepest portion. The groove 134g is typically positioned in axial overlap with the media, but it can be radially outside of the media.

Figure 15:
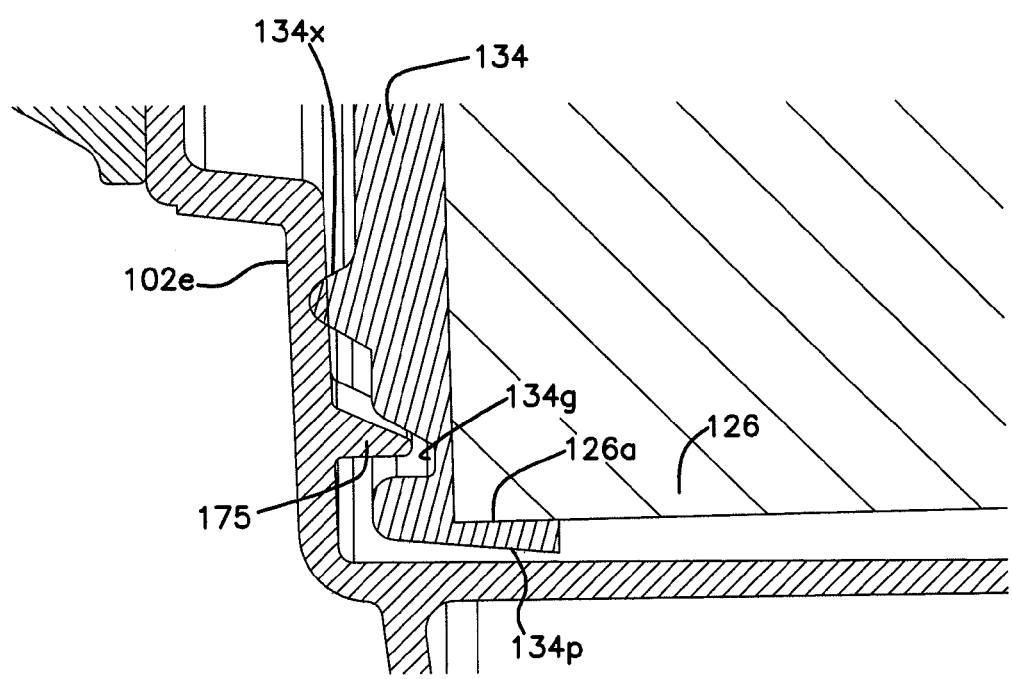
FIG. 15 is an enlarged fragmentary schematic view of an identified portion of FIG. 14.

Referring to FIGS. 14 and 15, example housing 102 depicted, includes at end 102e, spaced radially outwardly from aperture 102o, a projection or projection arrangement 175 that projects toward end 103e. The projection arrangement 175 comprises one or more projections positioned to project into (insert into) groove 134g, when cartridge 115 is installed. The projection arrangement 175 can be a continuous ring, a disjointed ring or one or more alternate individual projections, as desired. In FIG. 15, a portion of projection 175 can be seen received within groove 134g.

The projection/receiver arrangement comprises projection arrangement 175 and groove 134, helps ensure that the cartridge 115 installed is a proper cartridge for the system of concern. If the cartridge 115 is not a proper cartridge, with a groove 134g at the proper location, installation will be more difficult with many systems.

In addition, it is noted that the groove 134g is positioned peripherally radially outwardly spaced from the projection 134x. Further, the end wall 102e is typically smooth and non-contoured where it is engaged by the projection 134x, to help ensure proper support of the cartridge 115 in position.

It is noted that receiving groove 134g and projection arrangement 175 are analogous to those described, can also be applied in the embodiment of FIGS. 1-13, if desired.

It is also noted that it is preferred that the outer perimeter 134p, FIG. 15, of end cap 134 extend radially outwardly from an outer pleat tip perimeter 126p by no more than 8 mm, typically no more than 5 mm and often no more than 4 mm. That is, preferably there is only a small amount of material in region 134p with respect to radially outward projection. This is in part because, as discussed above, it is desirable (preferable) for the outer perimeter of the two end caps 134, 135, FIG. 16, to be the same, or nearly the same. Thus, given the conical shape, generally the end cap 135 has a greater radial projection in region 135p, outwardly, radially, from an adjacent the pleat tip perimeter than does region 134p of end cap 134. A reason why it is desirable to have the same perimeter size for the end caps 134, 135, in a typical application, is that so that the cartridge 116 can be installed in a housing previously configured for receipt of a cylindrical element, if desired, while at the same time providing for a desirable amount of media and media characteristic, when used in the conical configuration depicted.

Attention is now directed to features relating to interaction among the main filter cartridge 115, framework 132 (typically contained in safety cartridge 116) and the access cover 103. With respect to these features, attention is first directed to FIG. 23, a fragmentary cross-sectional view of a selected portion of framepiece 160. In particular, attention is directed to the cross-sectional view of central 142c, of end flange 142. Central portion 142c as previously described is generally closed.

Referring to FIG. 20, central portion 142c has an inner surface 142i and an opposite outer surface 142x. For the particular framepiece 160 depicted, the inner and outer surfaces 142i, 142x, respectively of the central 142c are contoured as mirror images. Referring still to FIG. 23, central portion 142c can be characterized as having an outer wall section 180 which projects radially inwardly of the resulting cartridge 115, FIG. 6, to a location surrounded by media end 126b of media pack 126. Radially inwardly positioned from wall 180 is provided a preferred outer groove 181 in outer surface 142x, with a matching projection 181p and surface 142i.

Positioned radially inwardly from groove 181, outer surface 142x includes a ring projection 182 projection away from end cap 134 of cartridge 115, FIG. 16, and toward end cap 135. This projection 182 has on an opposite side thereof a corresponding recess 182i on surface 142i.

Positioned radially inwardly from projection 182, is provided an (inner) receiving groove 183 in surface 142x (in a corresponding projection 183i in surface 142i). The receiving groove 183, in the example shown, is a continuous groove positioned between inner and outer sidewalls 183x, 183y, respectively. The outer sidewall 183y is typically positioned radially inwardly from the media 126, FIG. 16, a distance of at least 15 mm, usually at least 20 mm, preferably at least 30 mm and often within the range of 20-50 mm, inclusive, although in some instances over greater spacing is possible. Within at least an inner most (deepest) ⅓ of the groove 183, a distance between inner wall 183x and outer wall 183y, is typically no greater than 30 mm, often no greater than 25 mm, usually no greater than 20 mm, and, often, an amount, within the range of 5-20 mm, inclusive. Typically, the sidewalls 183x, 183y provide for a groove 183 that is at least about 5 mm, typically at least 10 mm in depth, and often greater in depth, from an end 183z of the outer sidewall 183y, in extension toward end cap 134, FIG. 16.

It is noted that the groove 183 forms, on an opposite side 142i of region 142, a circular ring projection 183p. The groove 183 in projection 183p can be continuous, and typically is. Typically, the shapes of groove 183 and projection 183p are circular.

Positioned radially inwardly of projection 183p (or groove 183) end section 142c includes a central outwardly projecting projection 185 (or inwardly facing recess 185i). Projection 185 is generally central, and comprises a projection away from end cap 134. For the particular example depicted, projection 185 does not extend axially outwardly from a location surrounded by the media pack 126, although in some instances it could. The central projection 185 is somewhat conical, in the example depicted, although alternatives are possible. The inner surface 185*i* defines a central recess as characterized below.

In general terms, projection 185 is generally at least 10 mm, usually at least 20 mm and typically 20-60 mm in dimension, from an inner most portion (defined by projection 183*p*) to an outermost tip 185*p*. Alternatives are possible.

Attention is next directed to certain features at closed end 146 of tower 132, which comprises a frame support (in the example depicted) of the safety cartridge 116. In particular, attention is directed to FIG. 25. Here end 146 can be seen as comprising a central projection 146*p* surrounded by recess 146*r*. Recess 146*r* or receiving groove, in an outer surface 146*x* of end 146 generally surrounded and defines projection 146*p*. Typically, projection 146*p* is centered on end 146, projecting in a direction away from end pieces 150, i.e. toward access cover 103, when installed. The projection 146*p* is sized and configured to project into receiver 185*i* of framepiece 116 in cartridge 115, when the main cartridge 115 is positioned over the tower 132 (and safety cartridge 116), see FIG. 14.

Still referring to FIG. 25, recess 146*y*, and outer surface 146*i*, is sized to receive, projecting therein, the projection comprising ring projection 143*p*, FIG. 23.

Referring to FIG. 25, radially around receiver 146*r* is positioned a projecting ring 146*y* in outer surface 146*i*. The projecting ring 146*n* is sized to project into receiver 182*i* on an interior surface 142*i* of region 142*c*, FIG. 23.

Referring now to FIG. 14, certain detail regarding the access cover 103 is viewable. The access cover 103 includes an inner surface 103*i* with a projection 103*p* extending toward end 102*e* of housing 102. The projection 103*p* is sized to extend into recess or inner resulting groove 183 of the main cartridge 115. Radially inwardly from projection 103*p* access cover 103 includes a central outer projection 103 having an interior recess 103*t* on surface 103*i*. This recess is sized to receive projecting therein, projection 155, FIG. 23, on outer surface 142*i* of cartridge 115.

Nesting of the tower 132, main cartridge 115 and access cover 103 is shown in FIG. 14.

During assembly, if tower 132 is removable (for example as a safety cartridge 116) it can be first installed. If it is not aligned perfectly as the cartridge 115 is installed, it will tend to straighten the tower 132 appropriately. When the access cover 103 is positioned, it will ensure that the cartridge 115 is maintained in a proper orientation for use, and if out of line, cartridge 115 will be straight. The overall nesting will also help ensure that the components installed are the appropriate ones for the assembly of use.

In FIG. 24, an alternate cross-section along lines 24-24, FIG. 22 is depicted, as a fragmentary cross-sectional view of a portion of the framepiece 160. One can see in FIG. 24, various fins, for example as indicated at 190, which can operate as centering fins to help center the cartridge 160 relative to the tower 132, as the cartridge 115 is installed over the tower 130, if the tower is out of proper axial alignment. Also, fins 190 help strengthen region 142.

In FIG. 26, a perspective view of safety cartridge 116 and tower 132 is depicted. One can see central projection 146*p*, surrounded by recess 146*r* at outer ring projection 146*n*.

Figure 27:
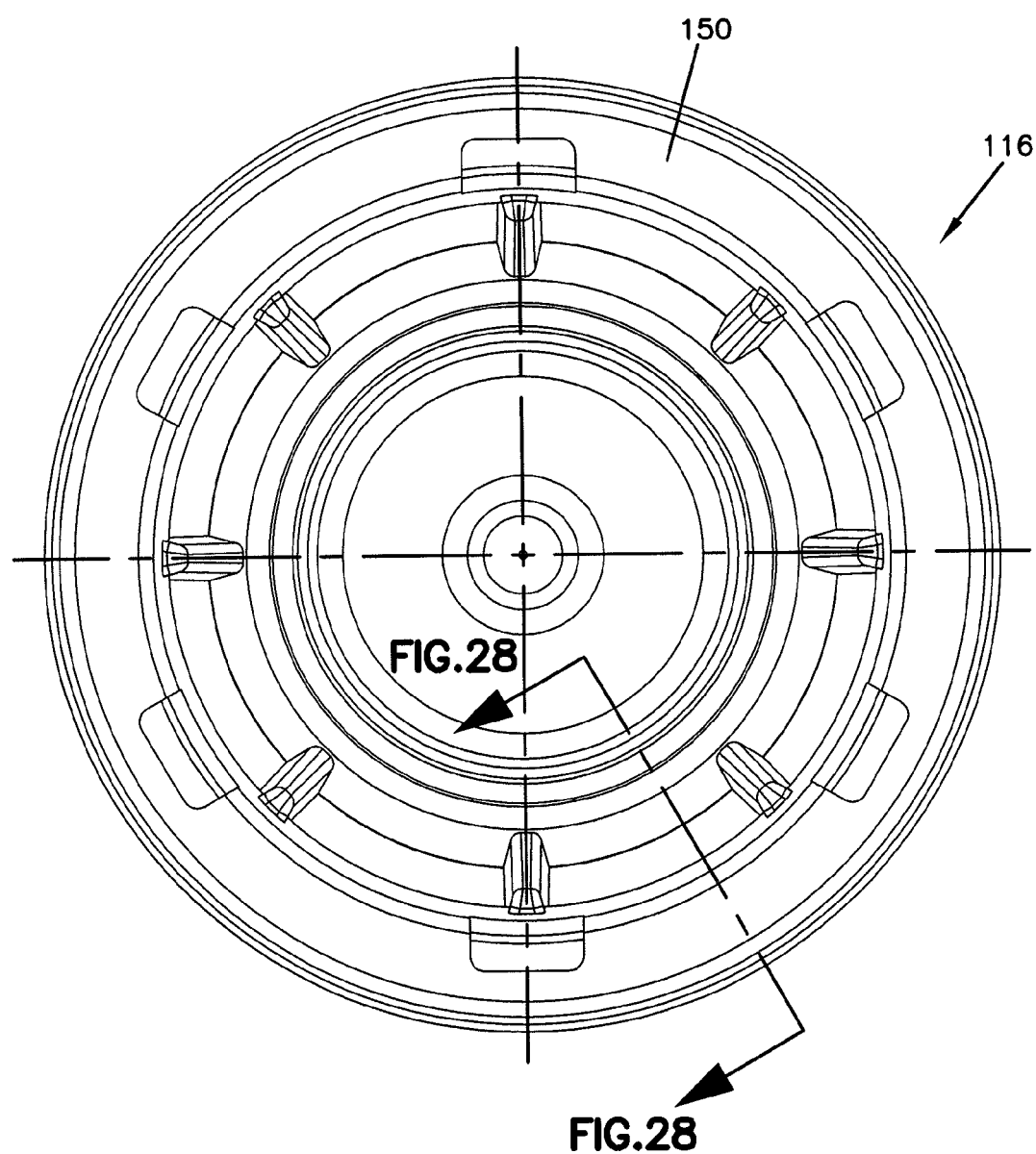
FIG. 27 is an open end elevational view of a safety cartridge component of FIG. 25.
Figure 28:
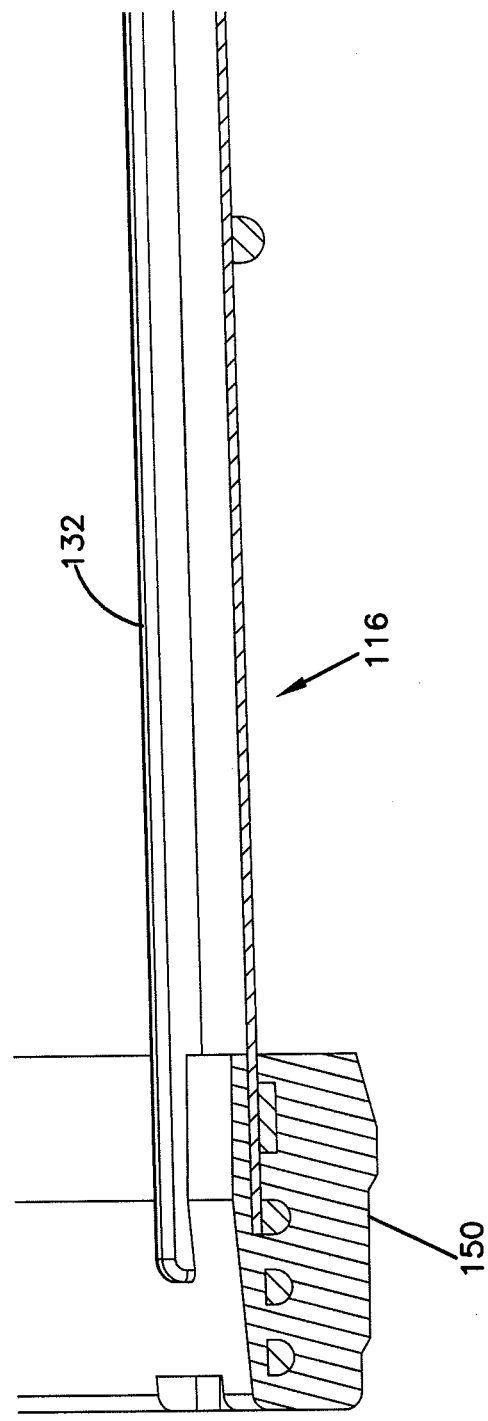
FIG. 28 is an enlarged fragmentary schematic cross-sectional view of a selected portion of the safety cartridge of FIG. 25, taken generally along 28-28, FIG. 27.

In FIG. 27, an end view taken toward end 150 of safety cartridge 116 is viewable. In FIG. 28, a fragmentary cross-sectional view taken along line 28-28, FIG. 27 is provided. Here, one can see end piece 150 molded-in-place on tower 132.

It is noted that in a typical application, the tower 132 will be positioned in a safety construction 116, i.e. the tower 132 will support the media. However, in some applications principles according the present disclosure, for tower 132, can be a framepiece without media therein. Indeed in some instances, it can be permanently positioned within housing, rather than removably positioned therein. When such is the case, i.e. when the tower 132 is not used as part of a safety, there is no specific requirement for a seal between the tower 132 and the housing.

In the embodiment of FIGS. 14-28, various dimension for an example system are provided as follows: AA=4 mm; AB=349 mm; AC=3 mm; AD=131.4 mm diameter; AE=30'; AF=4.3 mm; AG=3 mm; AH=1 mm; AI=4 mm; AJ=164.5 mm diameter; AK=175°; AL=164.5 mm diameter; AM=120°; AN=2.5°; AO=94.6 mm diameter; AP=30.4 mm; AQ=346.5 mm; AR=66.9 mm.

Referring to dimension AG, FIG. 17, it is noted that in some alternate preferred applications, this dimension would be reduced by 0.5-3.5 mm, by moving a bottom of groove 134*g* closer to the outer perimeter of the media 126. Typically, the bottom of groove 134*g*, at its closest point to the outer perimeter of the media, will be no more than 3 mm from the outer perimeter of the media.

Nesting among the cartridge 116, access cover 103 and tower 132, can generally be analogous to similar features described in WO 2009/014986, incorporated herein by reference, if desired.

Figure 29:
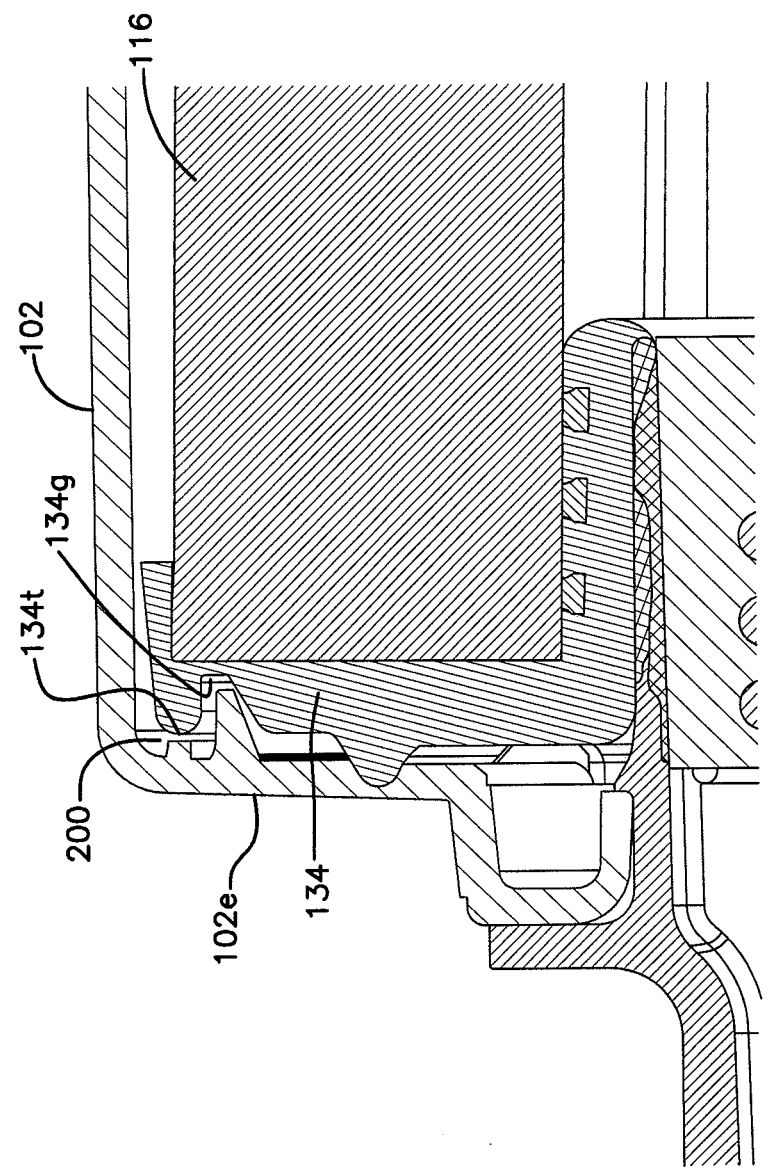
FIG. 29 is a fragmentary schematic cross-sectional view of a selected portion of an air cleaner assembly generally in accord with FIG. 14, but showing a modification thereto.
Figure 30:
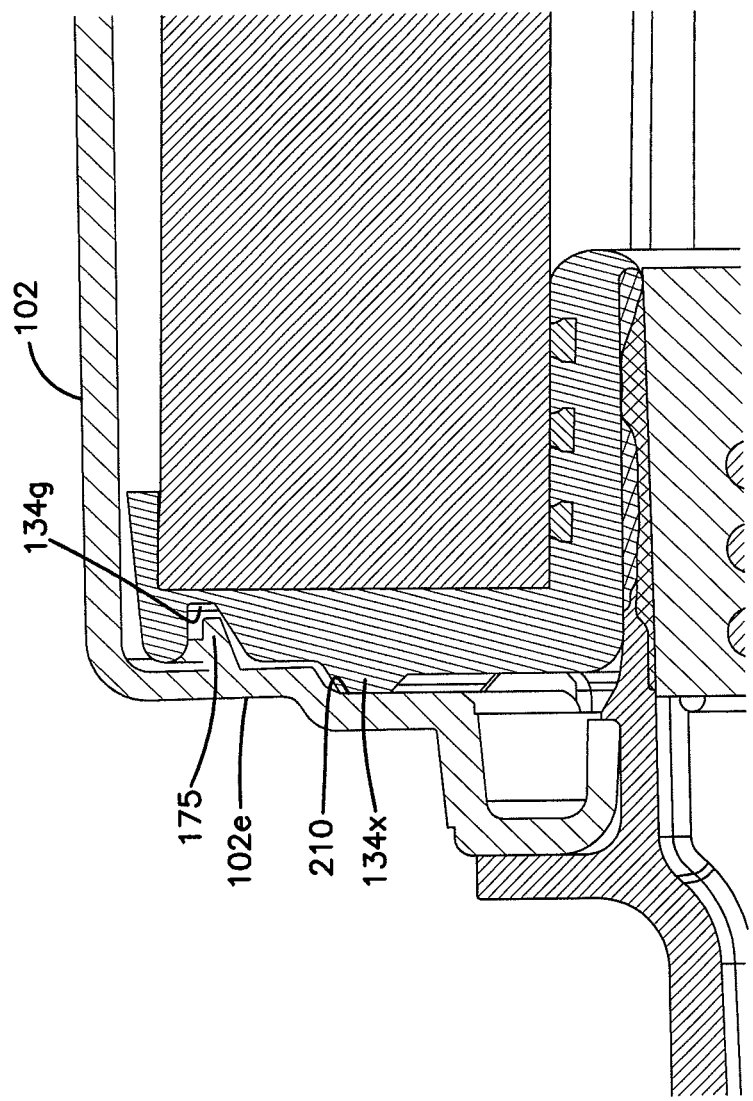
FIG. 30 is a schematic fragmentary cross-sectional view analogous to FIG. 29, but showing an additional variation.

Attention is now directed to FIGS. 29 and 30.

FIGS. 29 and 30 depict fragmentary cross-sectional views showing some alternate housing features at housing 102*e*. Referring first to FIG. 29, in general, the assembly depicted is analogous to assembly 101, except for projection 200 on end 102*e* of the housing 102 configured to engage a tip 134*t* of the end piece 134 at a location radially outwardly from groove 134*g*. During installation, projection 200 can press into tip 134*t*, if made sufficiently long, to stabilize the cartridge 116.

In FIG. 30, an alternate variation is provided. Here end wall 102*e* of housing 102 is provided with an inner step or recess at 210 at a location radially inwardly from projection arrangement 175 and groove 134*g*. Recess 210 can be used to engage projection 134*x*, to facilitate projection of projection 175 deeply into groove 134*g*. Other features of FIG. 30 can be as generally previously discussed for assembly 101.

It is noted that variations of FIGS. 29 and 30 can also be implemented with the earlier embodiment of FIGS. 1-13, if desired.

There is no specific requirement that an assembly, component, feature or method include all of the detail depicted in the drawings, in order to obtain some benefit according to the present disclosure.

General Features

There is no specific requirement that a component, feature or assembly include all of the characteristics and features described or depicted herein, in order to obtain some benefit according to the present disclosure. The techniques can be practiced with a wide variety of air cleaner assemblies and components.

Further, the drawings depict more than one embodiment. Features of each embodiment can be implemented with the other, if desired.

According to an aspect of the present disclosure, an air filter cartridge is provided comprising an extension of media having first and second, opposite, ends and positioned surrounding an open interior. The extension of media defines a central cartridge axis, in a typical example; and, the extension of media extends between first and second end pieces. In examples depicted, the first end piece is at the first end of the media, is open, and defines a radially directed housing radial seal; in an example depicted a radially inwardly directed housing radial seal. In examples depicted, the first end includes a receiving groove therein located with a deepest portion thereof positioned a distance radially (from an outer perimeter of the media at the first end of the media) no more than 20% (typically no more than 10% and preferably an amount within the range of 1-0.9%) of a distance across the first end piece from an outer perimeter of the media at the first end of the media toward the central axis. This positioning can be in axial overlap with the media, or it can be radially outwardly from overlap with the media.

A typical example also includes a second end piece having an outer surface and an inner surface; the outer surface typically and preferably having a receiving groove therein; and, the inner surface typically and preferably having a central receiver projecting away from the first end piece.

In preferred examples depicted and described, the deepest portion of the receiving groove in the first end piece is located radially a distance of no more than 7 mm (across the first end piece) from the outer perimeter of the media of the first end; typically a distance of no more than 5 mm (across the first end piece) from an outer perimeter of the media at the first end.

In an alternate indication of selected aspects of the present invention, the cartridge can be defined similarly, but without a specific definition of the spacing of the groove from the outer perimeter of the media, with respect to a distance from the outer perimeter of the media to a central axis. In such a definition, receiving groove can be, for example, simply identified as located with a deepest portion thereof spaced radially no more than 7 mm (across the first end piece) typically no more than 5 mm (across the first end piece) from an outer perimeter of the media at the first end. Again, this positioning can be in axial overlap with the media or it can be radially outside of the outer perimeter of the media.

In an example arrangement, the receiving groove on the outer surface of the second end piece has inner and outer walls; the outer wall being spaced radially inwardly at least 20 mm from the media, often at least 30 mm from the media and in some instances, substantially more.

In an example described, a deepest one-third of the receiving groove in the outer surface of the second end piece is positioned between inner and outer walls spaced no more than 30 mm apart, typically no more than 25 mm apart, and often no more than 20 mm apart.

In an example described herein, the media is conical with a decreasing outer perimeter size in extension from the first end piece toward the second end piece. Also, in a typical example, the receiving groove in the first end piece is at least 1.5 mm deep; typically it is at least 2 mm deep and in some instances, at least 3 mm deep from a closed adjacent outer axial surface of the first end cap.

Typically, the first end piece has an outer dimension within the range of at least 100 mm, for example 100 mm-350 mm inclusive, typically 100-250 mm, inclusive, and in the example depicted, 130-250 mm, inclusive, thereacross.

An example cartridge is depicted including a preform having an inner liner section surrounded by an extension of media. The inner section is disposed between the first and second end pieces. The inner liner section can (optionally) be configured to extend completely between the first and second end pieces. In an example depicted, both the media and inner liner section are conical.

In an example depicted, the cartridge includes a preform having an end section, the end section of the preform including a closed central section; and, a support structure extending across an end (typically the second end) of the media. The support structure extending across the end of the media can be porous and in examples depicted it is. It can, for example, comprise a lattice structure, although alternatives are possible. Typically, the support structure extends completely across an end of the media, but alternatives are possible.

In an example depicted, the close central section of the preform defines an outer recess; and, an inner projection on an opposite side of the closed central section from the outer recess. The outer recess is typically at least 6 mm deep in projection inwardly from the support structure extending across the media, typically at least 10 mm deep and often substantially more.

In an example depicted, a plurality of spaced radially inwardly directed centering fins are oriented adjacent the second end piece, preferably on a preform for example on a preform inner liner section. Each centering fin typically has an edge extending radially inwardly in extension toward the second end piece, of a preform.

Typically, the preform includes an inner liner section and an end section, which are non-separable portions of the preform. They can be integral portions of the preform.

Typically the media is pleated, although alternatives are possible.

In an example depicted, even when the media is conical, the first end piece has a largest cross-sectional dimension within the range of 0.85-1.15×, inclusive, of a largest cross-sectional dimension of the second end piece. Typically, the largest cross-sectional definition of first end piece is within the range of 0.9-1.1×, preferably 0.92-1.08× and often 0.95-1.05× of the largest cross-sectional dimension across the second end piece.

In an example, the first end piece has a largest cross-sectional dimension is the same as the largest cross-sectional dimension of the second end piece, even with a conical media.

According to an aspect of the present disclosure, an air cleaner assembly is provided and comprises a housing including an air flow inlet; an air flow outlet; and, an ejector outlet. The housing includes a removable access cover. A main filter cartridge positioned within the housing is in accord with selected ones of the characterizations above, and the access cover has a projection thereon extending into a recess on the outer surface of the second end piece. In an example depicted, the housing includes a projection extending into the groove on the first end piece.

In an example assembly depicted, the outer surface of the second end piece includes a receiving groove having an outer wall space radially at least 20 mm from the media (typically at least 30 mm from the media); a central receiver on the inner surface of the second end piece as surrounded by the receiving groove on the second end piece; and, the access cover includes a projection extending into the receiving groove on the outer surface of the second end piece.

In an example depicted, the air cleaner assembly includes a tower projecting toward the access cover from an end of the housing opposite the access cover. The tower includes an end directed toward the access cover that has a central projection projecting into the central receiver on the inner surface of the second end piece of the main air filter cartridge. The tower can be removably mounted, or non-removably mounted, in the housing. The tower can (optionally) comprise a portion of a safety cartridge, or include a safety media thereon.

In an example depicted, a central potion on the end of the tower that is directed toward the access cover, is surrounded by a receiving groove in the tower. The tower in an example depicted has a conical sidewall.

In an example air cleaner assembly depicted, the housing includes a side air flow inlet and an axial air flow outlet.

According to an advantageous aspect of the present disclosure, an air filter cartridge is provided comprising an extension of media: having first and second, opposite, ends; positioned surrounding an open interior; and, extending between first and second end pieces. The cartridge is usable as a main or primary air filter cartridge in an air cleaner assembly. Example depicted cartridges include a preform having an inner liner or inner liner section and an end or end section.

In an example depicted, the inner liner section extends completely between the first and second end pieces and is surrounded by the extension of media, although alternatives are possible. In an example depicted, the end section of the preform includes: a closed central section; and, a support structure (for example, flange section) projecting radially outward from the liner section and extending across an end of the media, in particular the second end of the media. The support structure can be porous and can be defined as a lattice structure. The term "closed central section" in this context, it is meant that the end section has a closed (i.e. non-permeable to air flow) portion that extends generally across an open interior of the media at a location adjacent or near the second end of the media. The support structure typically extends completely across an end of the media, although alternatives are possible.

In examples depicted, the first end piece is an open end piece that is molded-in-place on the first end of the media and defines a housing seal, typically a radially directed housing seal. In specific examples depicted, the first end piece defines a radially inwardly directed housing seal.

The second end piece includes an overmold portion having the support structure of the preform section embedded therein (and if porous) closed thereby. The overmold portion of the second end piece, and the first end piece, can be molded-in-place, for example, from foamed polyurethane, as described.

In examples depicted, the liner section and the end section of the preform cannot be separated from one another. Typically, they are integral, e.g. molded integral from plastic; that is, they are a portion of a single molded plastic piece.

Examples air filter cartridges are depicted which are both outer liner free and outer shield free, although alternatives are possible. The media of the cartridge can be pleated and/or unpleated media. It can be a combination of both.

In example arrangements depicted, the media (and when present and in continuous extension between the first and second ends, the inner liner section) is conical with a decreasing outer perimeter size in extension from the first end piece toward the second end piece. Typically, the conical angle or, angle of declination inward, is at least 0.2°, not more than 10°, and typically within the range of 0.2°-6°, inclusive, although alternatives are possible. It is noted that in some applications, the media and inner liner section can be cylindrical rather than conical.

The cartridge (typically on the inner liner section) can include a plurality of spaced, radially inwardly directed, centering fins adjacent the second end piece. Each of the radially inwardly centering fins preferably includes an edge extending radially (i.e. extending toward a central axis of the cartridge) in extension (for example from the inner liner section) toward the second end piece. The centering fins or projections can help center an appropriately positioned main filter cartridge relative to an internally positioned safety filter cartridge, or tower, during use.

In an example arrangement depicted, the main air filter cartridge is such that the closed central section of the preform defines: an outer recess; and, an inner projection on an opposite side of the closed central section from the outer recess. The term "outer" in this context is meant to refer to a portion of the closed central section that faces away from the first end of the preform and first end of the media. The inner projection, then, generally extends inwardly of the cartridge toward the first end of the media.

Although alternatives are possible, the outer recess is typically defined as at least 5 mm deep, usually at least 6 mm deep and typically with a depth of 10-35 mm, inclusive (and in some instances deeper than 35 mm) in extension inwardly from the flange section and/or, the second end of the media; the recess, again, extending toward a first end of the media.

In an alternate advantageous characterization of the features described herein, an air filter cartridge (usable, for example, as a main air filter cartridge in an air cleaner assembly) is provided comprising again an extension of media having first and second opposite ends in position surrounding (and defining) an open interior and extending between first and second end pieces. Typically, again, the media will be pleated, although alternatives are possible. Also, although alternatives are possible, the media can be conical, with a decreasing outer perimeter size in extension from the first end piece toward the second end piece. In this characterized cartridge, the first end piece is an open end piece molded-in-place on the first end of the media and defining a radially directed housing seal, typically a radially inwardly directed housing seal. A second end piece is closed to the passage of unfiltered air therethrough, and can, for example, be formed as a composite from a preform and an overmold.

Again, with the second characterization, the cartridge is typically outer liner free and outer shield free, although alternatives are possible.

Typically the cartridge optionally includes an inner liner surrounded by the media (optionally extending completely between the first end piece and the second end piece) and a plurality of radially inwardly directed centering fins (typically on the inner) liner adjacent the end piece. The centering fins can be as previously characterized.

Typically, the second end piece includes a closed central section defining an outer recess and an inner projection on an opposite side of the end section from the outer recess. The outer recess and inner projection can be generally as previously described. The outer recess typically extends at least 5 mm, usually at least 6 mm, and often an amount within the range of 10-35 mm, inclusive, and in some instances more than 35 mm in projection inwardly from the second end of the extension of the media toward first end of the extension of the media, although alternatives are possible.

Also according to an aspect of the present disclosure, an air filter cartridge usable as a safety cartridge with the previously described main air filter cartridge is described. The safety filter cartridge comprises, for example, a typically (conical) extension of unpleated media extending between opposite ends. A framepiece is provided supporting the media, the frame piece defining first and second ends. The framepiece first end is an open end. The framepiece second end is a closed end with a central, outer, recess, therein. In examples depicted, example depicted framepiece second includes at least one, and typically a plurality of radially outwardly directed ribs thereon, adjacent, and surrounding, the closed end. An outwardly directed housing radial seal is positioned on the framepiece first end.

An air cleaner assembly is also described including a housing having a side air flow inlet, an axial air flow outlet; and, an ejector outlet. The housing includes a removable access cover. The ejector outlet can be included on the removable access cover as shown.

The main air filter cartridge having various ones of the features described previously can be operably positioned within the housing. By "operably positioned" it is meant that the cartridge is appropriately positioned for use, and is serviceable, i.e. removable or replaceable, within the housing. The main air filter cartridge can be positioned over an internally positioned safety cartridge, as described.

The air cleaner assembly housing can include, on the removable access cover, a projection that extends into an end recess of the main filter cartridge and safety cartridge. Further, an end projection on the main air filter cartridge can be positioned extending into a recess of the safety cartridge.

It is noted that when the main air filter cartridge is constructed out of preferred materials as characterized, it is fully combustible. Also, it is noted that the preform described, with the end flange extending across an end of the media adjacent the closed end, provides strength in the closed end cap, and facilitates cartridge integrity during repeated installation and removal. Further, it is noted that when the recess in the safety cartridge, and projection on the main cartridge, are sized to engage one another as shown in FIG. 2, then even an alternate main cartridge, with a closed end of smaller outer diameter than an inside of shield 20, FIG. 2, will be supported by internal support of the projection 42p on the preform 6 extending into the receiver 46x on the safety, and being surrounded by a portion of the closed end of the safety.

Still other advantages will be apparent from discussions provided herein.

In FIGS. 14-30, an alternate embodiment of an air cleaner assembly and components thereof, in accord with the present disclosure, is provided. The embodiment can be made in accord with features described with the first embodiment, FIGS. 1-13, and has characterized above, if desired. Also, the features of the second embodiment can be implemented in the first embodiment, if desired.

The specific depicted examples are intended to be exemplary only, to indicate application of various principles of the present disclosure. The principles can be applied in a variety of alternate configurations, with alternate specific detail.

As indicated, there is no specific requirement that an arrangement or assembly include all of the features characterized herein, or depicted in the drawings, in order to obtain some benefit according to the present disclosure.

What is claimed:

1. An air filter cartridge comprising:
   (a) an extension of media having first and second, opposite, ends and positioned surrounding an open interior;
      (i) the extension of media defining a central cartridge axis; and,
      (ii) the extension of media extending between first and second end pieces;
   (b) the first end piece being at the first end of the media and being an open end piece defining a radially inwardly directed housing radial seal at a location within an aperture surrounded by the media;
      (i) the first end piece including a receiving groove therein located with a deepest portion thereof positioned a distance radially from an outer perimeter of the media, at the first end of the media, corresponding to no more than 20% of a distance across the first end piece from the outer perimeter of the media at the first end of the media toward the central cartridge axis; and,
   (c) the second end piece having an outer surface and an inner surface;
      (i) the outer surface having a receiving groove therein; and,
      (ii) the inner surface having a central receiver projecting away from the first end piece.

2. An air filter cartridge according to claim 1 wherein:
   (a) the deepest portion of the receiving groove in the first end piece is located radially no more than 7 mm across the first end piece from the outer perimeter of the media at the first end.

3. An air filter cartridge according to claim 1 wherein:
   (a) the media is conical with a decreasing outer perimeter size in extension from the first end piece toward the second end piece.

4. An air filter cartridge according to claim 3 including:
   (a) a preform having an inner liner section surrounded by the extension of media.

5. An air filter cartridge according to claim 4 wherein:
   (a) the inner liner section is conical with a decreasing outer perimeter size in extension toward the second end piece.

6. An air filter cartridge according to claim 5 wherein:
   (a) the cartridge includes a preform having an end section;
      (i) the end section of the preform including: a closed central section; and, support structure extending across an end of the media.

7. An air filter cartridge according to claim 6 wherein:
   (a) the support structure on the end section of the preform extends completely across an end of the media.

8. An air filter cartridge according to claim 6 wherein:
   (a) the support structure extending across an end of the media is porous.

9. An air filter cartridge according to claim 1 including:
   (a) a plurality of spaced, radially inwardly directed, centering fins adjacent the second end piece.

10. An air filter cartridge according to claim 3 wherein:
    (a) the first end piece has a largest cross-sectional dimension within the range of 0.85-1.15×, inclusive, of a largest cross-sectional dimension of the second end piece.

11. An air filter cartridge according to claim 3 wherein:
    (a) the first end piece has a largest cross-sectional dimension within the range of 0.95-1.05×, inclusive, of a largest cross-sectional dimension of the second end piece.

12. An air filter cartridge according to claim 11 wherein:
    (a) the first end piece has a largest cross-sectional dimension that is the same as a largest cross-sectional dimension of the second end piece.

13. An air filter cartridge according to claim 1 further comprising:
    (a) a preform having an inner liner section and an end section;
       (i) the inner liner section being surrounded by the extension of media;
       (ii) the end section including: a closed central section; and, a flange section comprising support structure extending across an end of the media; and,
       (iii) the end section and inner liner section being non-separable, portions of the preform;
    (b) the first end piece being an open end piece molded-in-place on the first end of the media and defining a radially directed housing radial seal; and,
    (c) the second end piece including an overmold portion with the support structure of the preform, extending across an end of the media, embedded therein.

14. An air filter cartridge according to claim 13 wherein:
    (a) the end section on the preform extends completely across an end of the media.

15. An air filter cartridge according to claim 1 wherein:
    (a) the cartridge is outer liner free and outer shield free.

16. An air filter cartridge according to claim 1 wherein:
(a) the extension of media is a conical extension of media having first and second, opposite, ends;
(b) the second end piece is a closed end piece; and,
(c) the first end piece has a largest cross-sectional dimension within the range of 0.85-1.15×, inclusive, of a largest cross-sectional dimension of the second end piece.

17. An air filter cartridge according to claim 16 wherein:
(a) the first end piece has a largest cross-sectional dimension within the range of 0.92-1.08×, inclusive, of a largest cross-sectional dimension of the second end piece.

18. An air cleaner assembly comprising:
(a) a housing including: an air flow inlet; an air flow outlet; and, an ejector outlet;
  (i) the housing including a removable access cover; and,
(b) a main air filter cartridge according to claim 1 operably and removably positioned within the housing; the main air filter cartridge comprising:
  (i) an extension of media having first and second, opposite, ends extending between first and second end pieces;
    (A) the extension of media surrounding an open interior and defining a central cartridge axis; and,
  (ii) the first end piece being at the first end of the media and being an open end piece defining a radially inwardly directed housing radial seal at a location within an aperture surrounded by the media;
    (A) the first end piece including a receiving groove therein located with a deepest portion thereof positioned a distance radially from an outer perimeter of the media, at the first end of the media, corresponding to no more than 20% of a distance across the first end piece from the outer perimeter of the media at the first end of the media toward the central cartridge axis; and,
  (iii) the second end piece having an outer surface and an inner surface;
    (A) the outer surface having a recess therein; and,
    (B) the inner surface having a central receiver projecting away from the first end piece;
(c) the access cover having a projection thereon extending into the recess on the outer surface of the second end piece; and,
(d) the housing having a projection extending into the receiving groove on the first end piece.

19. An air filter cartridge comprising:
(a) an extension of media having first and second, opposite, ends and positioned surrounding an open interior;
  (i) the extension of media defining a central cartridge axis; and,
  (ii) the extension of media extending between first and second end pieces;
(b) the first end piece being at the first end of the media and being an open end piece defining a radially inwardly directed housing radial seal;
  (i) the first end piece including a receiving groove therein located with a deepest portion thereof positioned a distance radially from an outer perimeter of the media, at the first end of the media, corresponding to no more than 20% of a distance across the first end piece from the outer perimeter of the media at the first end of the media to the central axis;
(c) the second end piece having an outer surface and an inner surface;
  (i) the outer surface having a receiving groove therein; and,
  (ii) the inner surface having a central receiver projecting away from the first end piece; and,
(d) a plurality of spaced, radially inwardly directed, centering fins adjacent the second end piece.

20. An air filter cartridge according to claim 19 wherein:
(a) the centering fins are positioned on an inner liner section surrounded by the media.

* * * * *